US012604003B2

(12) United States Patent
Andrivon et al.

(10) Patent No.: US 12,604,003 B2
(45) Date of Patent: Apr. 14, 2026

(54) ENCODING/DECODING VIDEO PICTURE PARTITIONED IN CTU GRIDS

(71) Applicant: Dolby International AB, Dublin (IE)

(72) Inventors: Pierre Andrivon, Beijing (CN); Fabrice Leléannec, Beijing (CN)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

(21) Appl. No.: 18/850,883

(22) PCT Filed: Feb. 22, 2023

(86) PCT No.: PCT/CN2023/077699
§ 371 (c)(1),
(2) Date: Sep. 25, 2024

(87) PCT Pub. No.: WO2023/185331
PCT Pub. Date: Oct. 5, 2023

(65) Prior Publication Data
US 2025/0220173 A1 Jul. 3, 2025

(30) Foreign Application Priority Data

Mar. 31, 2022 (EP) ..................................... 22305406

(51) Int. Cl.
*H04N 19/119* (2014.01)
*H04N 19/186* (2014.01)
(Continued)

(52) U.S. Cl.
CPC ......... *H04N 19/119* (2014.11); *H04N 19/186* (2014.11); *H04N 19/70* (2014.11); *H04N 19/96* (2014.11)

(58) Field of Classification Search
CPC .... H04N 19/186; H04N 19/119; H04N 19/96; H04N 19/70
See application file for complete search history.

(56) References Cited

U.S. PATENT DOCUMENTS

| | | | |
|---|---|---|---|
| 2012/0082238 A1 | 4/2012 | Panusopone et al. | |
| 2019/0045210 A1* | 2/2019 | Guermazi ............ | H04N 19/159 |

(Continued)

OTHER PUBLICATIONS

Extended European Search Report Issued in Application No. 22305406.5 dated Sep. 28, 2022, 11 pages.

(Continued)

*Primary Examiner* — Neil R Mikeska
(74) *Attorney, Agent, or Firm* — Fish & Richardson P.C.

(57) ABSTRACT

A method for encoding a video picture into a bitstream of encoded video picture data, includes: obtaining a grid of coding-tree units to split at least one component of the video picture into coding-tree units, each coding-tree unit being a picture area subdivided according to a coding tree; determining at least one shifting offset by aligning at least one boundary of the grid of coding-tree units with at least one boundary separating picture areas with low spatial activity from picture areas with high spatial activity of the video picture; shifting the grid of coding-tree units according to the at least one shifting offset; obtaining encoded video picture data by encoding at least one coding unit (CU) of a coding tree associated with each coding-tree unit (CTU) of the shifted grid of coding-tree units; and writing the encoded video picture data into the bitstream.

20 Claims, 12 Drawing Sheets

(51) Int. Cl.
*H04N 19/70* (2014.01)
*H04N 19/96* (2014.01)

(56) References Cited

U.S. PATENT DOCUMENTS

| | | | | |
|---|---|---|---|---|
| 2020/0014921 | A1* | 1/2020 | Ikeda ..................... | H04N 19/82 |
| 2021/0195226 | A1* | 6/2021 | Zhao ..................... | H04N 19/124 |
| 2021/0409722 | A1* | 12/2021 | Xiu ....................... | H04N 19/105 |
| 2022/0232244 | A1* | 7/2022 | Li ........................ | H04N 19/159 |
| 2025/0220172 | A1* | 7/2025 | Leléannec ............ | H04N 19/119 |

OTHER PUBLICATIONS

ISA China National Intellectual Property Administration, International Search Report and the Written Opinion of the International Searching Authority Issued in Application No. PCT/CN2023/077699, Jun. 1, 2023, WIPO, 13 pages.
Agrafiotis, D. et al., "Towards Efficient Context-Specific Video Coding Based on Gaze-Tracking Analysis", ACM Transactions on Multimedia Computing, Communications and Applications, vol. 3, No. 4, Article 21, Dec. 2007, 15 pages.

* cited by examiner

MinQtSize

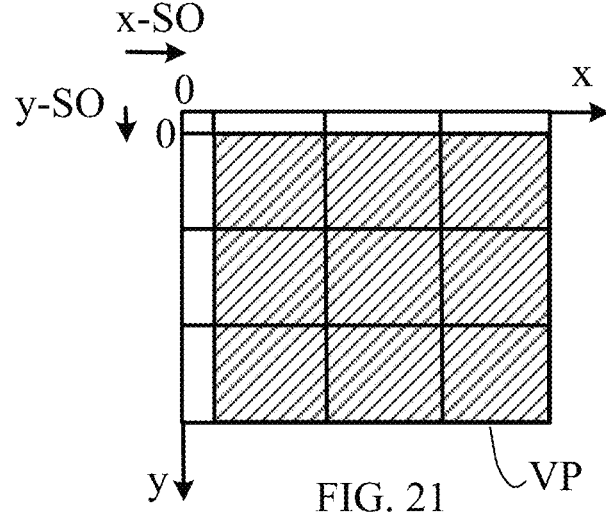
FIG. 21
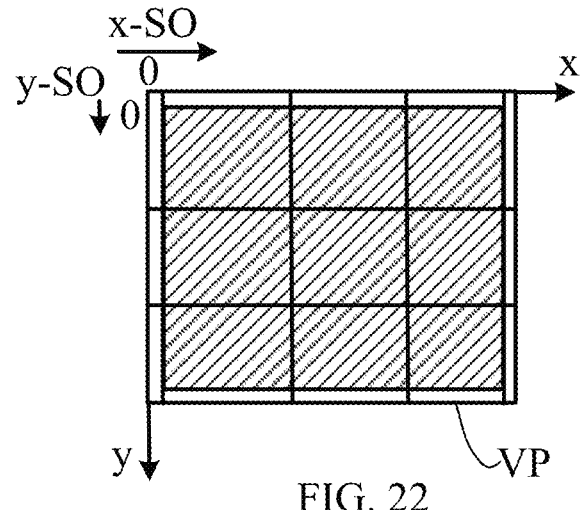
FIG. 22
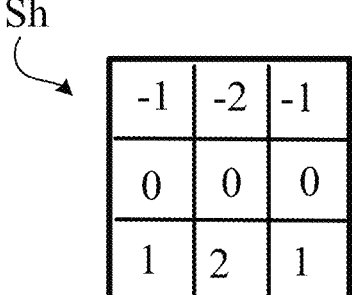 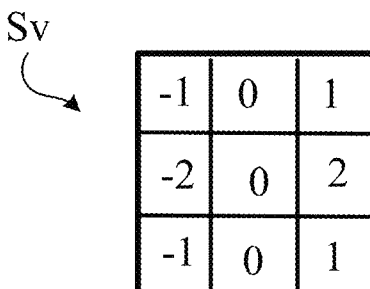
FIG. 23

| seq_parameter_set_rbsp( ) { | Descritptor |
|---|---|
| sps_seq_parameter_set_id | u (4) |
| sps_video_parameter_set_id | u (4) |
| sps_max_sublayers_minus 1 | u (3) |
| sps_chroma_format_idc | u (2) |
| sps_log2_ctu_size_minus5 | u (2) |
| sps_ctu_shift_flag | u (1) |
| if (sps_ctu_shift_flag ) { | |
| sps_ctu_left_offset | ue (v) |
| sps_ctu_top_offset | ue (v) |
| } | |
| sps_ptl_dpb_hrd_params_present_flag | u (1) |
| if( sps_ptl_dpb_hrd_params_present_flag) | |
| profile_tier_level( 1, sps_max_sublayer_minus1 ) | |
| sps_gdr_enabled_flag | u (1) |
| ... | |

FIG. 24

| coding tree unit( ) { | Descrirtor |
|---|---|
| xCtb = CtbAddrX ? (Ctb AddrX – 1) << CtbLog2SizeY +  ctbLeftOffset : | |
| yCtb = Ctb AddrY ? (Ctb AddrY – 1) << CtbLog2SizeY+ ctd TopOffset : 0 | |
| if( sh sao luma used flag  \|\|  sh  sao  chroma  used  flag ) | |
| ... | |

FIG. 25

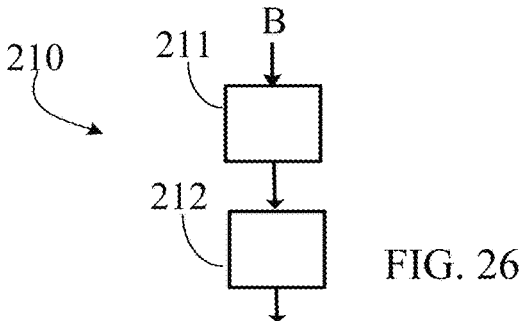

FIG. 26

ENCODING/DECODING VIDEO PICTURE PARTITIONED IN CTU GRIDS

CROSS-REFERENCE TO RELATED APPLICATION

This application is the U.S. National Stage Application of International Application No. PCT/CN2023/077699, filed on Feb. 22, 2023, which claims priority to and benefits of EP Patent Application No. 22305406.5, filed on Mar. 31, 2022, the entire content of both of which is incorporated herein by reference.

FIELD

The present application generally relates to video picture encoding and decoding. Particularly, but not exclusively, the technical field of the present application is related to partitioning video pictures in CTU grids for encoding/decoding of video picture data into/from a bitstream.

BACKGROUND

The present section is intended to introduce the reader to various aspects of art, which may be related to various aspects of at least one exemplary embodiment of the present application that is described and/or claimed below. This discussion is believed to be helpful in providing the reader with background information to facilitate a better understanding of the various aspects of the present application. Accordingly, it should be understood that these statements are to be read in this light, and not as admissions of prior art.

In the state-of-the-art video compression systems such as HEVC (ISO/IEC 23008-2 High Efficiency Video Coding, ITU-T Recommendation H.265, https://www.itu.int/rec/T-REC-H.265-202108-P/en) or VVC (ISO/IEC 23090-3 Versatile Video Coding, ITU-T Recommendation H.266, https://www.itu.int/rec/T-REC-H.266-202008-I/en, low-level and high-level picture partitioning are provided to divide a video picture into picture areas so-called Coding-Tree Units (CTU) which size may be typically between 8×8 and 64×64 pixels for HEVC and 32×32, 64×64, or 128×128 pixels for VVC.

The CTU division of a video picture VP (including a picture area that equals to the whole video picture area) forms a grid of fixed size CTUs, namely a CTU grid, in which upper and left boundaries spatially coincide with the top and left borders of the video picture VP as illustrated on FIG. 1. Grey shaded rectangles represent picture areas associated with entire CTUs of the CTU grid, i.e. CTUs with the same width and height, and white shaded rectangles represent partial (uncomplete) CTUs, i.e. CTUs with either a width lower than the width of an entire CTU and/or a height with a height lower than the height of an entire CTU. A 2D coordinate system (x,y) with an origin (0,0) is also shown on FIG. 1 to indicate that any spatial location of a sub-structure of a CTU grid is defined from said origin.

Improving the flexibility of the representation of a CTU grid is required to improve the compression efficiency of a video picture but without increasing the number of CUs resulting of the partitioning of CTUs of the CTU grid.

SUMMARY

The following section presents a simplified summary of exemplary embodiments in order to provide a basic understanding of some aspects of the present application. This summary is not an extensive overview of an exemplary embodiment. It is not intended to identify key or critical elements of an exemplary embodiment. The following summary merely presents some aspects of exemplary embodiments in a simplified form as a prelude to the more detailed description provided elsewhere in the document.

According to a first aspect of the present application, there is provided a method of encoding a video picture into a bitstream of encoded video picture data. The method comprises obtaining a grid of coding-tree units to split at least one component of the video picture into coding-tree units, each coding-tree unit being a picture area subdivided according to a coding tree; determining at least one shifting offset by aligning at least one boundary of the grid of coding-tree units with at least one boundary separating picture area with low spatial activity from picture areas with high spatial activity of the video picture; shifting the grid of coding-tree units according to the at least one shifting offset; obtaining encoded video picture data by encoding at least one coding unit of a coding tree associated with each coding-tree unit of the shifted grid of coding-tree units; and writing the encoded video data into the bitstream.

According to a second aspect of the present application, there is provided a method of decoding a video picture from a bitstream of encoded video picture data. The method comprises determining a grid of coding-tree units representing a spatial partition of the video picture, each coding-tree unit representing a picture area of the video picture subdivided according to a coding tree; shifting the grid of coding-tree units according to at least one shifting offset; obtaining video picture data by decoding at least one coding unit of a coding tree associated with each coding tree unit of the shifted grid of coding-tree units from the bitstream; and obtaining the video picture from said video picture data.

According to a third aspect of the present application, there is provided a bitstream of encoded a video picture generated by one of the method according to the first aspect of the present application.

According to a fourth aspect of the present application, there is provided an apparatus of encoding a video picture into a bitstream of encoded video picture data. The apparatus comprises means for performing one of the method according to the first aspect of the present application.

According to a fifth aspect of the present application, there is provided an apparatus of decoding a video picture from a bitstream of encoded video picture data. The apparatus comprises for performing one of the method according to the second aspect of the present application.

According to a sixth aspect of the present application, there is provided a non-transitory storage medium carrying instructions of program code for executing a method according to the first aspect of the present application.

According to a seventh aspect of the present application, there is provided a non-transitory storage medium carrying instructions of program code for executing a method according to the second aspect of the present application.

The specific nature of at least one of the exemplary embodiments as well as other objects, advantages, features and uses of said at least one of exemplary embodiments will become evident from the following description of examples taken in conjunction with the accompanying drawings.

BRIEF DESCRIPTION OF THE DRAWINGS

Reference will now be made, by way of example, to the accompanying drawings which show exemplary embodiments of the present application, and in which:

FIG. 21 shows an illustrated example of a CTU grid shifting in accordance with one exemplary embodiment;

FIG. 22 shows an illustrated example of a CTU grid shifting in accordance with one exemplary embodiment;

FIG. 23 shows examples of edge detection filters in accordance with at least one exemplary embodiment;

FIG. 24 shows an example of a syntax element seq_parameter_set-rbsp in accordance with at least one exemplary embodiment;

FIG. 25 shows an example of the syntax element coding_tree_unit in accordance with at least one exemplary embodiment;

FIG. 26 shows schematic block diagram of step 210 in accordance with at least one exemplary embodiment.

Similar or same elements are referenced with the same reference numbers.

DESCRIPTION OF EXEMPLARY
EMBODIMENTS

Exemplary embodiments are described hereinafter with reference to the accompanying figures. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the disclosure is intended to cover all modifications, equivalents, and alternatives falling within the spirit and scope of the present application.

In the state-of-the-art video compression systems such as HEVC (ISO/IEC 23008-2 High Efficiency Video Coding, ITU-T Recommendation H.265, https://www.itu.int/rec/T-REC-H.265-202108-P/en) or VVC (ISO/IEC 23090-3 Versatile Video Coding, ITU-T Recommendation H.266, https://www.itu.int/rec/T-REC-H.266-202008-I/en, low-level and high-level picture partitioning are provided to divide a video picture into picture areas so-called Coding-Tree Units (CTU) which size may be typically between 8×8 and 64×64 pixels for HEVC and 32×32, 64×64, or 128×128 pixels for VVC.

Figure 1:
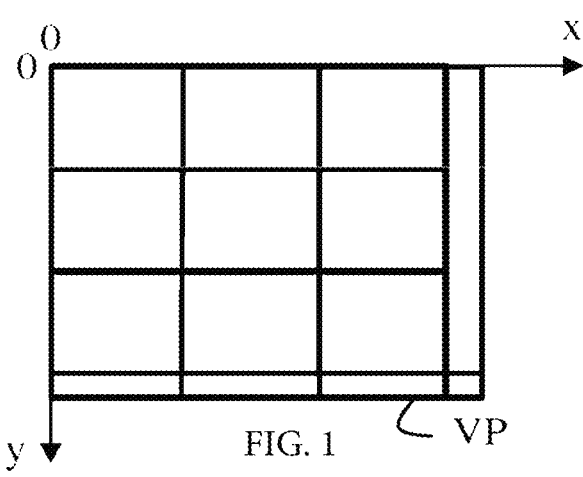
FIG. 1 shows an example of a CTU grid aligned with the top-left corner of a video picture in accordance with prior art.

The CTU division of a video picture VP (including a picture area that equals to the whole video picture area) forms a grid of fixed size CTUs, namely a CTU grid, in which upper and left boundaries spatially coincide with the top and left borders of the video picture VP as illustrated on FIG. 1. Grey shaded rectangles represent picture areas associated with entire CTUs of the CTU grid, i.e. CTUs with the same width and height, and white shaded rectangles represent partial (uncomplete) CTUs, i.e. CTUs with either a width lower than the width of an entire CTU and/or a height with a height lower than the height of an entire CTU. A 2D coordinate system (x,y) with an origin (0,0) is also shown on FIG. 1 to indicate that any spatial location of a sub-structure of a CTU grid is defined from said origin.

Figure 2:
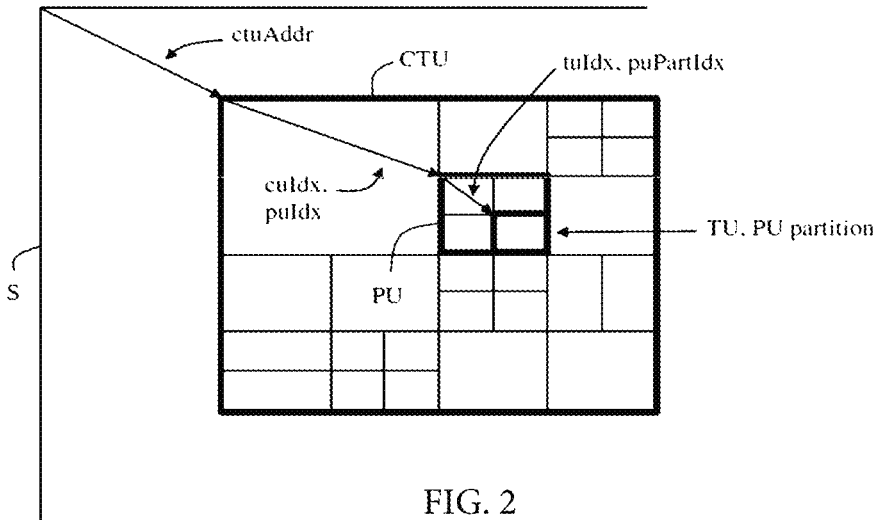
FIG. 2 shows an example of a coding-tree unit in accordance with HEVC.

For example, the spatial location of a top-left corner of a CTU of the CTU grid is determined from a CTU address ctuAddr defining a spatial position of the top-left corner of a CTU from said origin as illustrated on FIG. 2.

A coding tree is associated with each CTU to determine a tree-division of the CTU.

As illustrated on FIG. 2, in HEVC, the coding tree is a quad-tree division of a CTU, where each leaf is called a Coding Unit (CU). The spatial position of a CU in the video picture VP is defined by a CU index cuIdx defining a spatial position from the origin. A CU is spatially partitioned into one or more Prediction Units (PU). The spatial position of a PU in the video picture VP is defined by a PU index puIdx defining a spatial position from the top-left corner of the CTU and the spatial position of an element of a partitioned PU may be defined by a PU partition index puPartIdx defining a spatial position from the top-left corner of a PU. Each PU is assigned some intra or inter prediction parameters (prediction information). The intra or inter coding mode is assigned on the CU level. A CU may be also spatially partitioned into one or more Transform Units (TU). The spatial position of a TU in the video picture is defined by a TU index tuIdx defining a spatial position from the top-left corner of a PU. Each TU is assigned some transform parameters (prediction information). The transform mode is assigned on the PU level, and 2D separate transform is performed at TU level during the coding or decoding of a picture block.

Figure 3:
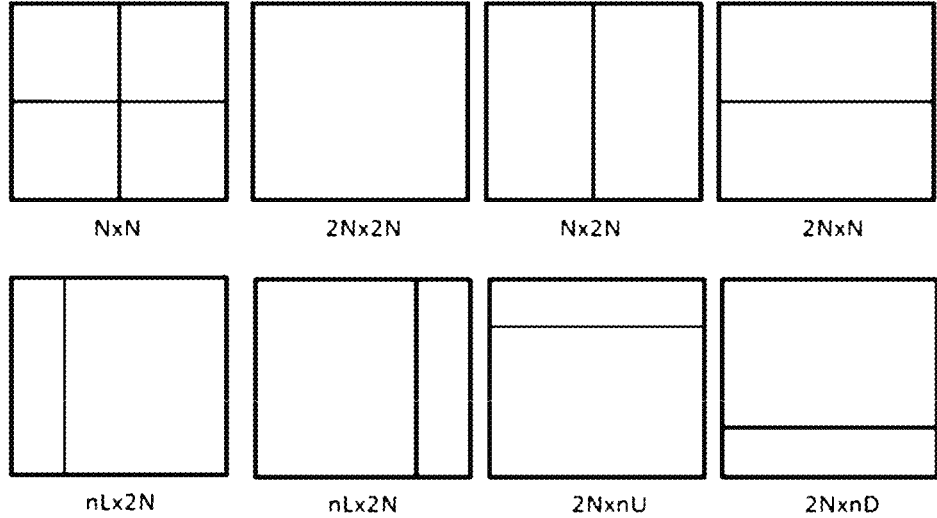
FIG. 3 shows an example of partitioning coding units into prediction units in accordance with HEVC.

The PU Partition types existing in HEVC are illustrated on FIG. 3. They include square partitions (2N×2N and N×N), which are the only ones used in both Intra and Inter CUs, symmetric non-square partitions (2N×N, N×2N, used only in Inter CUs), and asymmetric Partitions (used only in Inter CUs). For instance, the PU type 2N×nU stands for an asymmetric horizontal partitioning of the PU, where the smaller partition lies on the top of the PU. According to another example, PU type 2N×nL stands for an asymmetric horizontal partitioning of the PU, where the smaller partition lies on the top of the PU.

Figures 4, 5, 6:
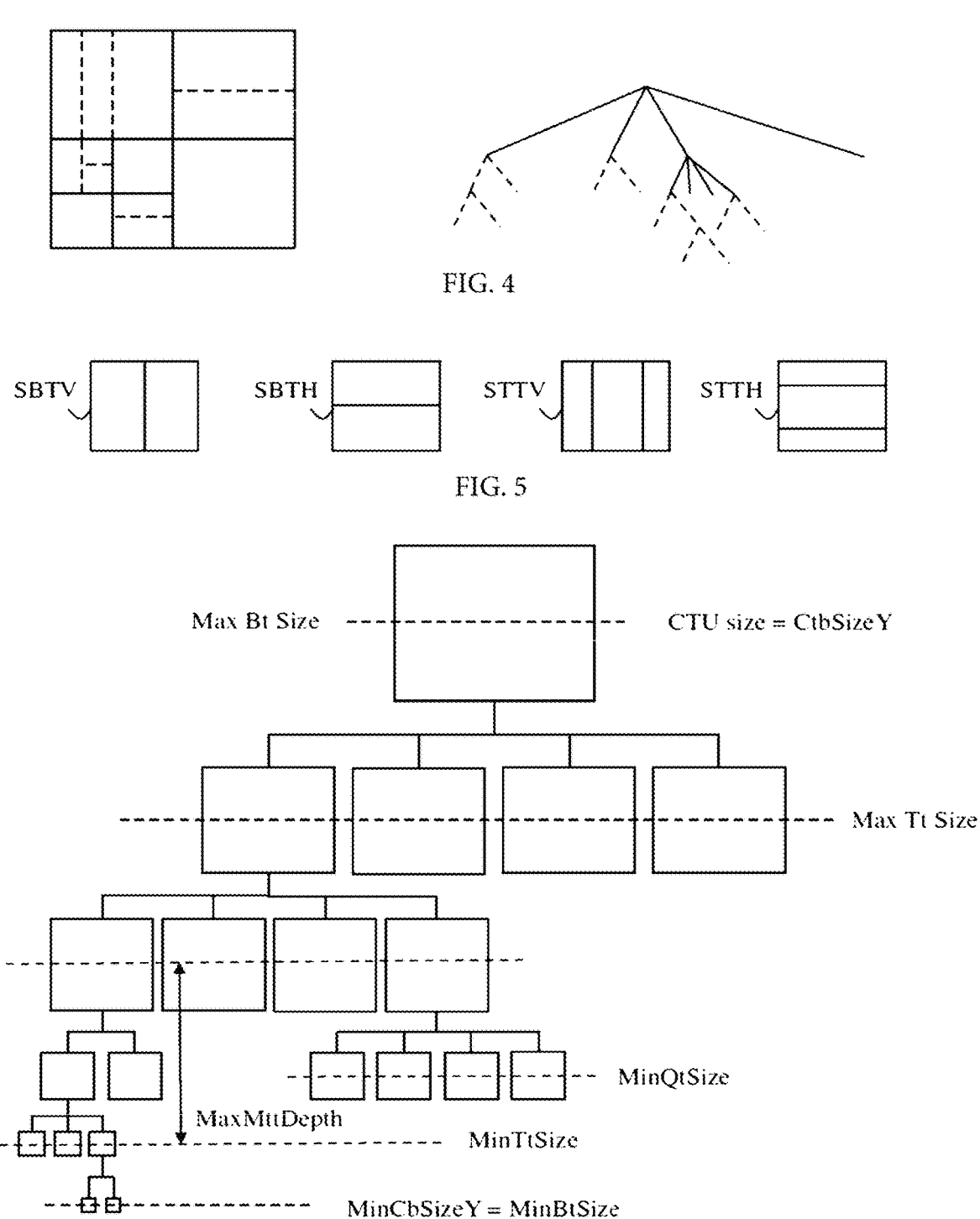
FIG. 4 shows an example of a CTU division in accordance with VVC.
FIG. 5 shows examples of split modes supported in the multi-type tree partitioning in accordance with VVC.
FIG. 6 shows examples of coding parameters used to configure the coding-tree representation of CTU in accordance with VVC.

As illustrated on FIG. 4, in VVC, the coding tree starts from a root node, i.e. the CTU. Next, a quad-tree (or quaternary tree) split divides the root node into 4 nodes corresponding to 4 sub-blocks of equal sizes (solid lines). Next, the quaternary-tree (or quad-tree) leaves can then be further partitioned by a so-called multi-type tree, which involves a binary or ternary split according to one of 4 split modes illustrated on FIG. 5. These split types are the vertical and horizontal binary split modes, noted SBTV and SBTH and the vertical and horizontal ternary split modes SPTTV and STTH.

The leaves of the coding tree of a CTU are CUs in the case of a joint coding shared by luma and chroma component.

In intra video picture, i.e. video picture encoded without inter prediction, separated coding trees may be used, for luma component on one side and chroma components on the other side. The luma component part of a CTU is called a luma coding-tree block (luma CTB). A luma CTB is then associated with a coding tree, which leaves are associated with luma coding blocks. Furthermore, in the case of separated luma/chroma coding trees, in the case of a 3-components picture, the two chroma component parts of a CTU share a same coding tree called chroma coding-tree block (chroma CTB). A chroma CTB is then associated with a coding tree, which leaves are associated with chroma coding blocks.

Contrary to HEVC, in VVC, in most cases, CU, PU and TUs have equal size, which means CUs are generally not partitioned into PUs or TU, except in some specific coding modes.

Compared to HEVC, the block structures of VVC have increased flexibility, since a CU may be square or rectangular, and many rectangular block shapes are allowed. This increased flexibility of coding structure leads to approximately 15% increase in compression efficiency, i.e. 15% average bitrate reduction at equivalent picture quality.

FIG. 6 shows schematically examples of coding parameters used to configure a coding-tree partitioning in accordance with VVC.

The coding parameter CTU size refers to the root node size of a quaternary tree (or quad-tree). The coding parameter CtbSizeY refers to the size of a luma CTB. The coding parameter MinCbSizeY refers to a minimum allowed coded block size for luma (Y). The coding parameter MinQTSize refers to a minimum allowed quad-tree leaf size, the coding parameter MaxBtSize refers to a maximum allowed binary tree root node size, the coding parameter MaxTtSize refers to a maximum allowed ternary tree root node size, the coding parameter MaxMttDepth refers to a maximum allowed hierarchy depth of multi-type tree splitting from a quad-tree leaf, the coding parameter MinBtSize refers to a minimum allowed binary tree leaf size and the coding parameter MinTtSize refers to a minimum allowed ternary tree leaf size.

The size of a VVC-coded video picture is a multiple of 8. Thus, a video picture size may not consist in a set of entire CTUs, i.e. the video picture size may not be a multiple of 32, 64 or 128. In that case, some partial CTUs may exist on the bottom or the right side of the video picture. Some block partitioning rules are usually used to handle the block partitioning of partial CTUs of the CTU grid spatially located, if exist, on the right and bottom video picture borders (White shaded rectangles on FIG. 1).

Figures 7, 8, 9, 10:
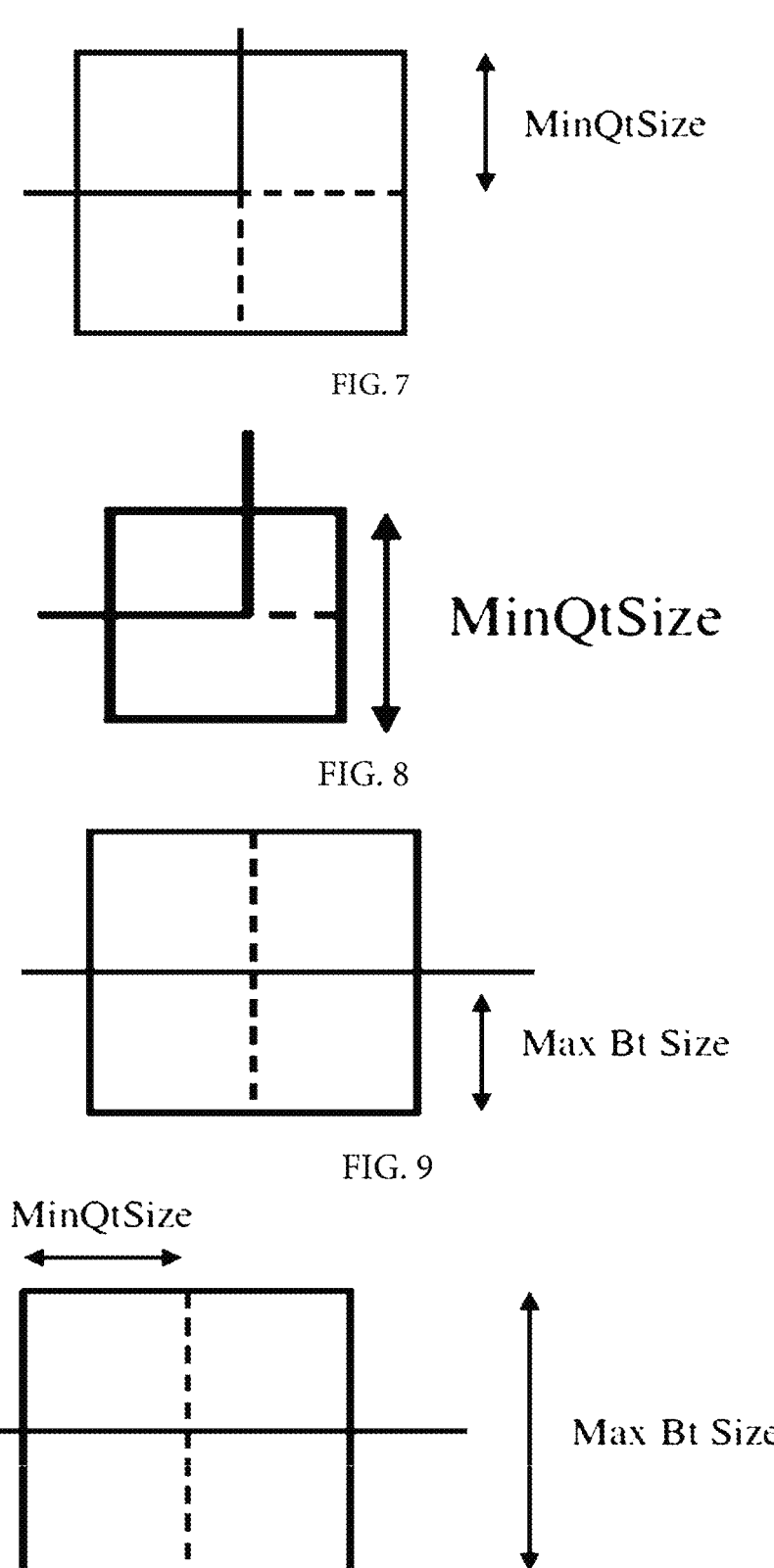
FIG. 7 shows an example illustrating rules for partitioning video picture borders.
FIG. 8 shows an example illustrating rules for partitioning video picture borders.
FIG. 9 shows an example illustrating rules for partitioning video picture borders.
FIG. 10 shows an example illustrating rules for partitioning video picture borders.

In one exemplary embodiment of the block partitioning rule, if a tree node block (a block associated with a tree node) exceeds both the bottom and the right picture boundaries (FIG. 7), if the block is associated with a quad-tree (QT) node and the size of the block is larger than MinQT-Size, QT split mode may be forced (dotted lines), otherwise, SBTH split mode may be forced (FIG. 8).

Figure 11:
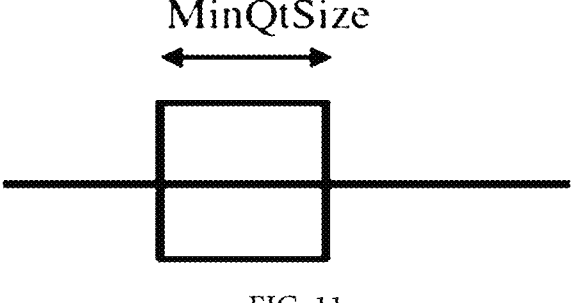
FIG. 11 shows an example illustrating rules for partitioning video picture borders.

If a tree node block exceeds either the bottom or the right video picture border, if the block is a quad-tree (QT) node, block size>MinQTSize, and block size>MaxBtSize, QT split may be forced (FIG. 9). Otherwise, if block is a QT node and block size>MinQTSize and block size<=MaxBtSize, the split may be forced, and the encoder may choose between QT or binary tree split with a forced boundary orientation (SBTH or SBTV) (FIG. 10). Otherwise (block is a multi-type tree or size<MinQTSize), binary tree split may be forced in the picture boundary orientation (FIG. 11).

In VVC, a high-level picture partitioning is also provided in which, basically, a video picture may be partitioned into sub-pictures, slices, and tiles.

A tile is a sequence of CTUs that covers a rectangular picture area of a video picture. The CTUs in a tile are usually scanned in raster scan order within that tile.

A slice comprises an integer number of tiles or an integer number of consecutive complete CTU rows within a tile. Consequently, each vertical slice boundary is always also a vertical tile boundary. It is possible that a horizontal boundary of a slice is not a tile boundary but consists of horizontal CTU boundaries within a tile; this occurs when a tile is split into multiple rectangular slices, each of which consists of an integer number of consecutive complete CTU rows within the tile.

Two modes of slices are supported, namely the raster-scan slice mode and the rectangular slice mode. In the raster-scan slice mode, a slice contains a sequence of complete tiles in a tile raster scan order of a video picture. In the rectangular slice mode, a slice contains either a number of complete tiles that collectively form a rectangular picture area or several consecutive complete CTU rows of one tile that collectively form a rectangular picture area. Tiles within a rectangular slice are scanned in tile raster scan order within the rectangular picture area corresponding to that slice.

A sub-picture contains one or more slices that collectively cover a rectangular picture area. Consequently, each sub-picture boundary is also always a slice boundary, and each vertical sub-picture boundary is always also a vertical tile boundary.

One or both of the following conditions shall be fulfilled for each sub-picture and tile:

All CTUs in a sub-picture belong to the same tile.

All CTUs in a tile belong to the same sub-picture.

Figure 12:
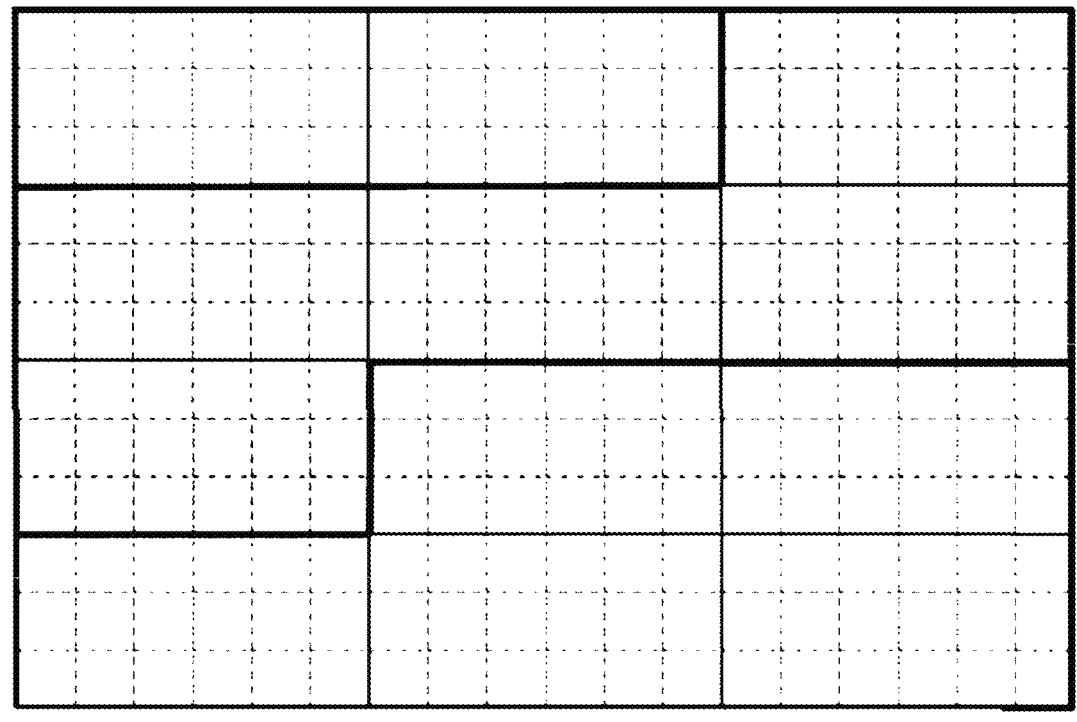
FIG. 12 shows an example of a video picture partitioning in the raster-scan slice mode.

FIG. 12 shows an example of a video picture partitioned with a 18×12 CTUs grid, 12 tiles of 6×3 CTUs each, and 3 raster-scan slices in the raster-scan slice mode (2 white shaded and 1 grey shaded).

Figure 13:
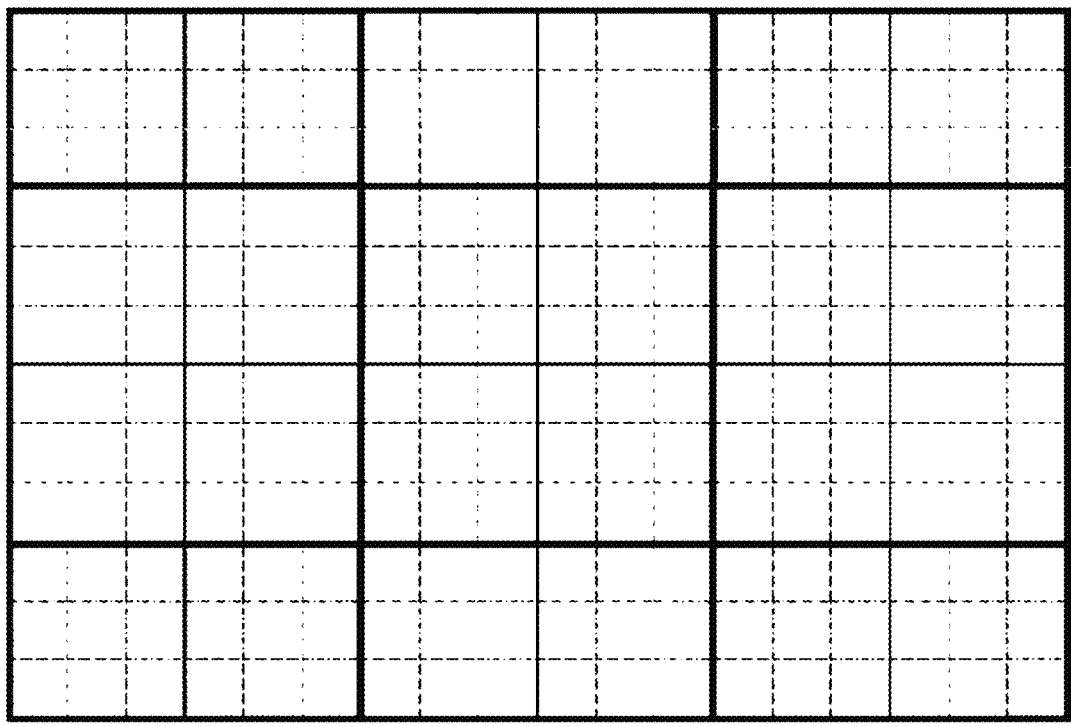
FIG. 13 shows an example of a video picture partitioning in the rectangular slice mode.

FIG. 13 shows an example of a video picture partitioned with a 18×12 CTUs grid, 24 tiles (6 tile columns of 3 CTUs width and 4 tile rows of 3 CTUs height) and 9 rectangular slices (4 white shaded and 5 grey shaded).

Figure 14:
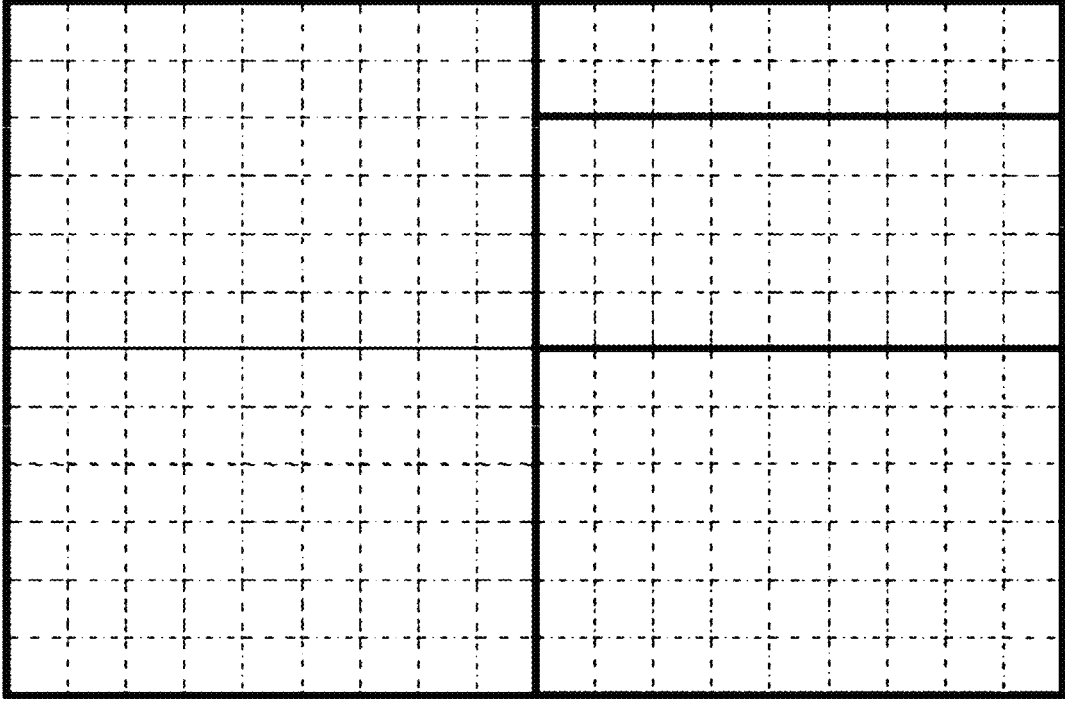
FIG. 14 shows an example of a video picture partitioned into tiles and rectangular slices.

FIG. 14 shows an example of a video picture partitioned with a 18×12 CTUs grid, 4 tiles (2 tile columns of 9×6 CTUs each) and 4 rectangular slices (2 white shaded and 2 grey shaded).

Figure 15:
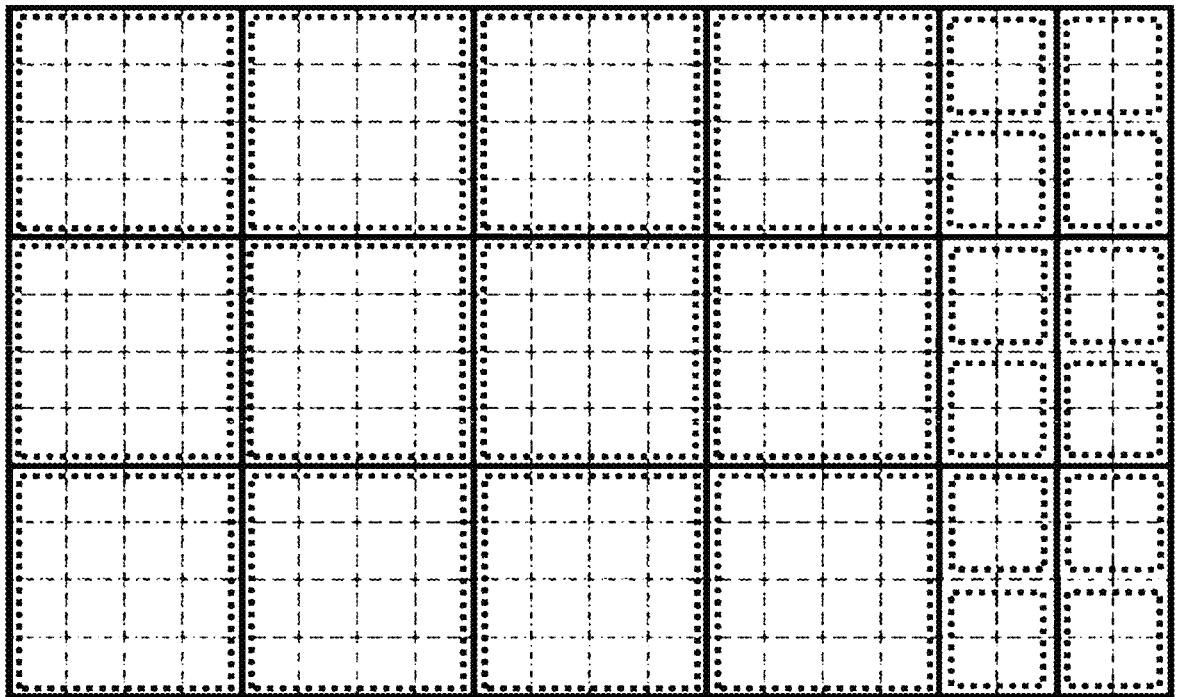
FIG. 15 shows an example of sub-picture partitioning of a video picture.

FIG. 15 shows an example of sub-picture partitioned with a 20×12 CTUs grid, 18 tiles (12 tiles each covering a slice of 4×4 CTUs, 6 tiles each covering 2 vertically-stacked slices of 2×2 CTUs) altogether resulting in 24 slices and 24 sub-pictures of varying dimensions (each slice is a sub-picture).

As above discussed, in VVC and HEVC, the CTU size (CTU width CTU DW and CTU height CTU DH) of all the CTUs of the CTU grid equals a same default CTU size for all the CTUs of the CTU grid. Also, the CTU grid is aligned to the top and left borders of the video picture VP (FIG. 1). Therefore, the CTU partitioning into CUs is designed to optimize the encoding of the video picture VP by adapting the CUs sizes and by aligning the CUs to spatial structures of the video picture VP, i.e. to maximise CU sizes in areas with homogenous content in terms of spatial activity. The goal is to optimize the coding efficiency, typically by means of large CUs covering low spatial activity picture areas and smaller CUs covering high spatial activity picture area.

Because CTUs of the CTU grid have all same fixed width and height, some CTUS may cover high spatial activity picture areas. Partitioning such CTUs into CUs leads to define an important number of CUs having small sizes. This leads to a potential lack of compression efficiency since it is generally more efficient to compress a low activity picture area with CUs (blocks) as large as possible.

Improving the flexibility of the representation of a CTU grid is required to improve the compression efficiency of a video picture but without increasing the number of CUs resulting of the partitioning of CTUs of the CTU grid.

At least one of the aspects generally relates to video picture encoding and decoding, one other aspect generally relates to transmitting a bitstream provided or encoded and one other aspects relates to receiving/accessing a decoded bitstream.

At least one of the exemplary embodiments is described for encoding/decoding a video picture but extends to the encoding/decoding of video pictures (sequences of pictures) because each video picture is sequentially encoded/decoded as described below.

Moreover, the at least one exemplary embodiments are not limited to MPEG standards such as HEVC, VVC, AVC (ISO/IEC 14496-10 Advanced Video Coding for generic audio-visual services, ITU-T Recommendation H.264, https://www.itu.int/rec/T-REC-H.264-202108-P/en), EVC (ISO/IEC 23094-1 Essential video coding) but may be applied to other standards and recommendations such as AV1 (AOMedia Video 1, http://aomedia.org/av1/specification/) for example. The at least one exemplary embodiment may apply to pre-existing or future-developed, and extensions of any such standards and recommendations. Unless indicated otherwise, or technically precluded, the aspects described in the present application may be used individually or in combination.

A pixel corresponds to the smallest display unit on a screen, which can be composed of one or more sources of light (1 for monochrome screen or 3 or more for colour screens).

A video picture, also denoted frame or picture frame, comprises at least one component determined by a specific picture/video format which specifies all information relative to pixel values and all information which may be used by a display unit and/or any other device to display and/or to decode video picture data related to said video picture.

A video picture comprises at least one component usually expressed in the shape of an array of samples.

A monochrome video picture comprises a single component and a color video picture may comprise three components.

For example, a color video picture may comprise a luma (or luminance) component and two chroma components when the picture/video format is the well-known (Y, Cb, Cr) format or may comprise three color components (one for Red, one for Green and one for Blue) when the picture/video format is the well-known (R, G, B) format.

Each component of a video picture comprises a same number of samples which equals to a number of pixels of a screen on which the video picture is intended to be display.

Alternatively, in the case of a video format comprises a luma component and two chroma components like the (Y, Cb, Cr) format, dependent on the color format considered, the chroma component may contain half the number of samples in width and/or height, relative to the luma component.

A sample is the smallest visual information unit of a component composing a video picture. A sample value may be, for example a luma or chroma value or a colour value of a (R, G, B) format.

A pixel value is the value of a pixel of a screen. A pixel value may be represented by one sample for monochrome video picture and by multiple co-located samples for color video picture. Co-located samples associated with a pixel mean samples corresponding to the location of a pixel in the screen.

It is common to consider a video picture as being a set of pixel values, each pixel being represented by at least one sample.

A block of a video picture, namely a picture block, is a set of samples of one component of the video picture. A block of at least one luma sample or a block of at least one chroma sample may be considered when the picture/video format is the well-known (Y, Cb, Cr) format, or a block of at least one color sample when the picture/video format is the well-known (R, G, B) format.

The at least one exemplary embodiment is not limited to a particular picture/video format.

Generally speaking, the present application relates to encoding/decoding a video picture into/from a bitstream of encoded video picture data. On the encoding side, a CTU grid is determined to split at least one component of the video picture into CTUs. At least one shifting offset, i.e. an offset value used for shifting CTUs of a CTU grid, is determined by aligning at least one boundary of the CTU grid with at least one boundary separating picture area with low spatial activity from picture areas with high spatial activity of the video picture. The CTU grid is then shifted according to the at least one shifting offset. Encoded video picture data is obtained by encoding at least one coding unit of a coding tree associated with each coding-tree unit of the shifted CTU grid, and the encoded video data is written into the bitstream.

On the decoding side, a CTU grid representing a spatial partition of at least one component of the video picture is determined and shifted according to at least one shifting offset. Video picture data is obtained by decoding at least one coding unit of a coding tree associated with each coding tree unit of the shifted CTU grid from the bitstream, and the video picture is obtained from the video picture data.

The present disclosure allows shifting the CTU grid according to at least one shifting offset. This improves flexibility of the representation of the CTU grid because shifting offsets may be determined to align boundaries of the CTU grid with main spatial structures of the video picture or of a component of the video picture. Shifting a CTU grid leads to CTUs that cover homogenous spatial activity picture areas, i.e. homogeneous picture areas in terms of spatial structure, and leads to a limited number of CUs resulting of CTU partitioning. Therefore, CUs, resulting of such CTU partitioning, may likely cover homogenous spatial activity picture areas.

Consequently, shifting a CTU grid during picture partitioning improves the compression efficiency of the video picture.

Moreover, shifting a CTU grid does not significantly increase the complexity of both the encoder and decoder and does not have significant extra-cost when shifting offsets are signaled into the bitstream of encoded video data.

Figure 16:
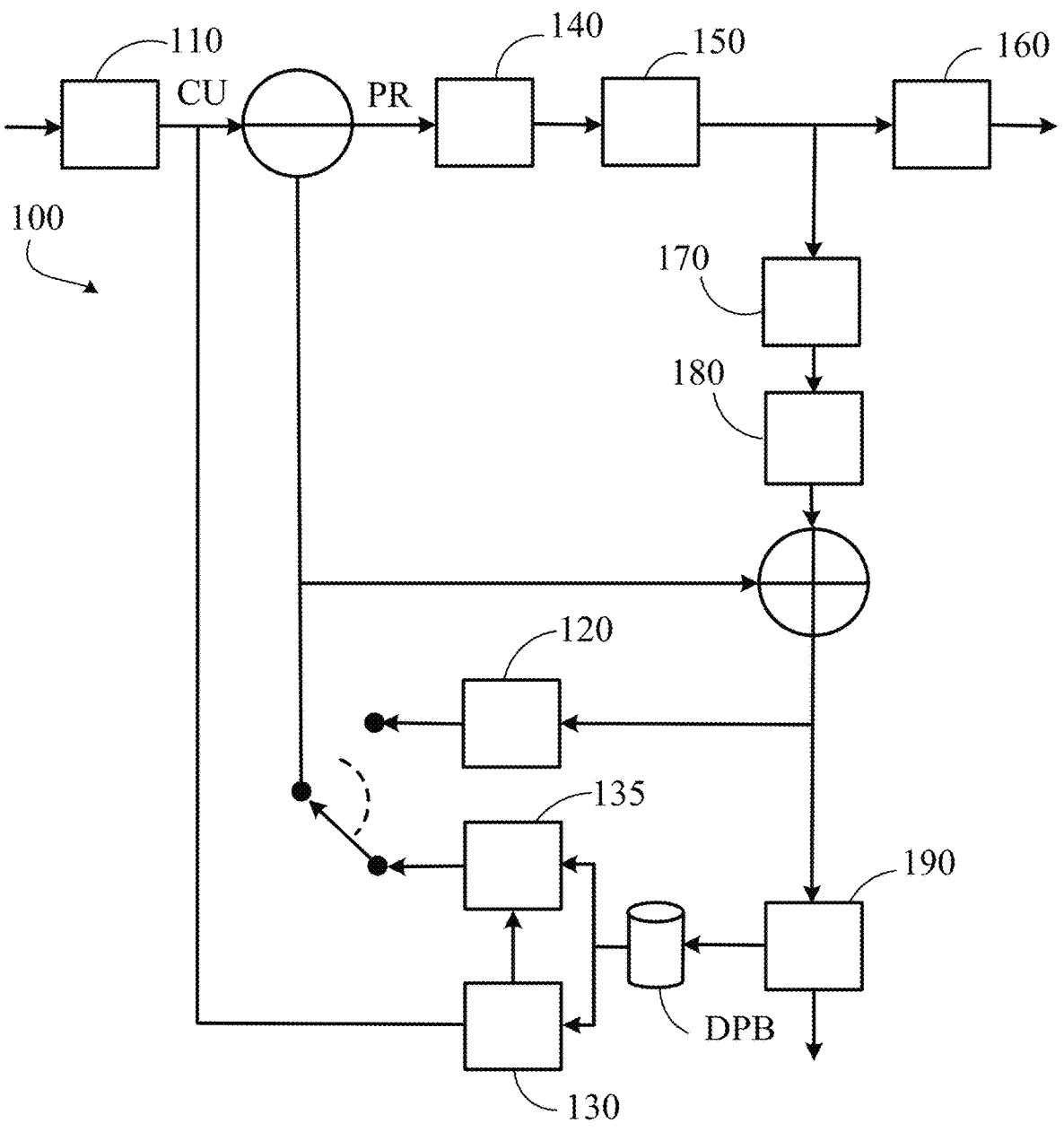
FIG. 16 shows a schematic block diagram of steps of a method 100 of encoding a video picture VP in accordance with at least one exemplary embodiment.
Figure 17:
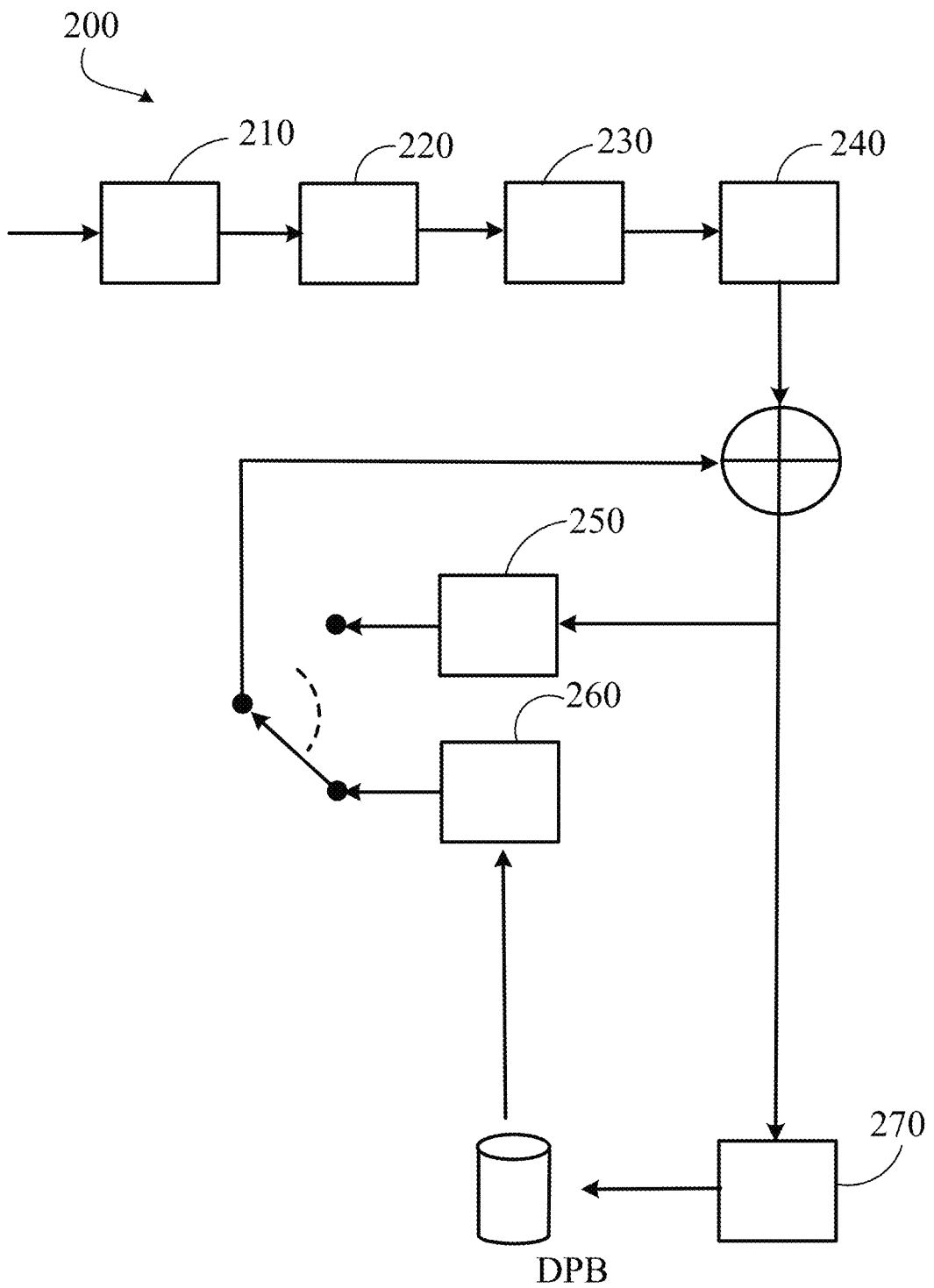
FIG. 17 shows a schematic block diagram of steps of a method 200 of decoding a video picture VP in accordance with at least one exemplary embodiment.

FIGS. 16 and 17 provide an overview of video encoding/decoding methods used in current video standard compression systems like VVC for example.

FIG. 16 shows a schematic block diagram of steps of a method 100 of encoding a video picture VP in accordance with prior art.

In step 110, a video picture VP is partitioned into a CTU grid and partitioning information data is signaled into a bitstream B. A coding tree is associated with each CTU of the CTU grid, each CU of a coding tree associated with each CTU being a block of samples of the video picture VP. In short, a CU of a CTU is a block.

CTUs of the CTU grid are considered along a scanning order, usually a raster scan order of the video picture. Each block of a CTU is also considered along a scanning order, usually a raster scan order of blocks of the CTU.

Each block of each CTU is then encoded using either an intra or inter prediction coding mode.

Intra prediction (step 120) consists in predicting a current block by means of a predicted block based on already encoded, decoded and reconstructed samples located around the current block, typically on the top and on the left of the current block. Intra prediction is performed in the spatial domain.

In inter prediction mode, motion estimation (step 130) and motion compensation (135) are performed. Motion estimation searches, in one or more reference video picture (s) used to predictively encode the current video picture, a candidate reference block that is a good predictor of the current block. For instance, a good predictor of the current block is a predictor which is similar to the current block. The output of the motion estimation step 130 is one or more motion vectors and reference picture index (or indices) associated to the current block. Next, motion compensation (step 135) obtains a predicted block by means of the motion vector(s) and reference picture index (indices) determined by the motion estimation step 130. Basically, the block belonging to a selected reference picture and pointed to by a motion vector may be used as the predicted block of the current block. Furthermore, since motion vectors are expressed in fractions of integer pixel positions (which is known as sub-pel accuracy motion vector representation), motion compensation generally involves a spatial interpolation of some reconstructed samples of the reference picture to compute the predicted block samples.

Prediction information data is signaled in the bitstream B. The prediction information may comprise a prediction mode, prediction information coding mode, intra prediction mode or motions vector(s) and reference picture index (or indices) and any other information used for obtaining a same predicted block at the decoding side.

The method 100 selects one of the intra mode or inter coding mode by optimizing a rate-distortion trade-off considering the encoding of a prediction residual block calculated, for example, by subtracting a candidate predicted block from the current block, and the signaling of prediction information data required for determining said candidate predicted block at the decoding side.

Usually, the best prediction mode is given as being the prediction mode of a best coding mode p* for a current block given by:

$$p^* = \underset{p \in P}{\mathrm{Argmin}} \{RD_{cost}(p)\} \qquad (1)$$

where P is the set of all candidate coding modes for the current block, p represents a candidate coding mode in that set, $RD_{cost}(p)$ is a rate-distortion cost of candidate coding mode p, typically expressed as:

$$RD_{cost(p)} = D(p) + \lambda \cdot R(p).$$

D(p) is the distortion between the current block and a reconstructed block obtained after encoding/decoding the current block with the candidate coding mode p, R(p) is a rate cost associated with the coding of the current block with coding mode p, and λ is the Lagrange parameter representing the rate constraint for coding the current block and typically computed from a quantization parameter used for encoding the current block.

The current block is usually encoded from a prediction residual block PR. More precisely, a prediction residual block PR is calculated, for example, by subtracting the best predicted block from the current block. The prediction residual block PR is then transformed (step 140) by using, for example, a DCT (discrete cosine transform) or DST (Discrete Sinus transform) type transform, and the obtained transformed coefficient block is quantized (step 150).

In variant, the method 100 may also skip the transform step 140 and apply quantization directly to the prediction residual block PR, according to the so-called transform-skip coding mode.

Quantized transform coefficient block (or quantized prediction residual block) is entropy encoded into the bitstream B (step 160).

Next, the quantized transform coefficient block (or the quantized residual block) is de-quantized (step 170) and inverse transformed (180) (or not), leading to a decoded prediction residual block. The decoded prediction residual block and the predicted block are then combined, typically summed, which provides the reconstructed block.

Other information data may also be entropy encoded for encoding a current block of the video picture VP.

In-loop filters (step 190) may be applied to a reconstructed picture (comprising reconstructed blocks) to reduce compression artefacts. Loop filter may apply after all picture blocks are reconstructed. For instance, they consist in deblocking filter, Sample Adaptive Offset (SAO) or adaptive loop filter.

The reconstructed blocks or the filtered reconstructed blocks form a reference picture that may be stored into a decoded picture buffer (DPB) so that it can be used as a reference picture for the encoding of a next current block of the video picture VP, or of a next video picture to encode.

FIG. 17 shows a schematic block diagram of steps of a method 200 of decoding a video picture VP in accordance with prior art.

In step 210, partitioning information data, prediction information data and quantized transform coefficient block (or quantized residual block) are obtained by entropy decoding a bitstream B.

Partitioning information data defines a CTU grid (arrangement) over the video picture. The CTU grid splits the video picture VP into multiple CTUs. CTUs of the CTU grid are considered along a scanning order, usually a raster scan order of the video picture VP. Blocks of a considered CTU are also considered along a scanning order, usually a raster scan order of blocks of the CTU.

Other information data may also be decoded from the bitstream B for decoding a current block of a current CTU of CTU grid.

In step 220, each current block of a current CTU is entropy decoded.

Each decoded current blocks may be either a quantized transform coefficient block or quantized prediction residual block.

In step 230, a current block (of a current CTU) is de-quantized and possibly inverse transformed (step 240), to obtain a decoded prediction residual block.

On the other hand, the prediction information data is used to predict the current block. A predicted block is obtained through its intra prediction (step 250) or its motion-compensated temporal prediction (step 260). The prediction process performed at the decoding side is identical to that of the encoding side.

Next, the decoded prediction residual block and the predicted block are then combined, typically summed, which provides a reconstructed block.

In step 270, in-loop filters may apply to a reconstructed picture (comprising reconstructed blocks) and the reconstructed blocks or the filtered reconstructed blocks form a reference picture that may be stored into a decoded picture buffer (DPB) as above discussed (FIG. 16).

Figure 18:
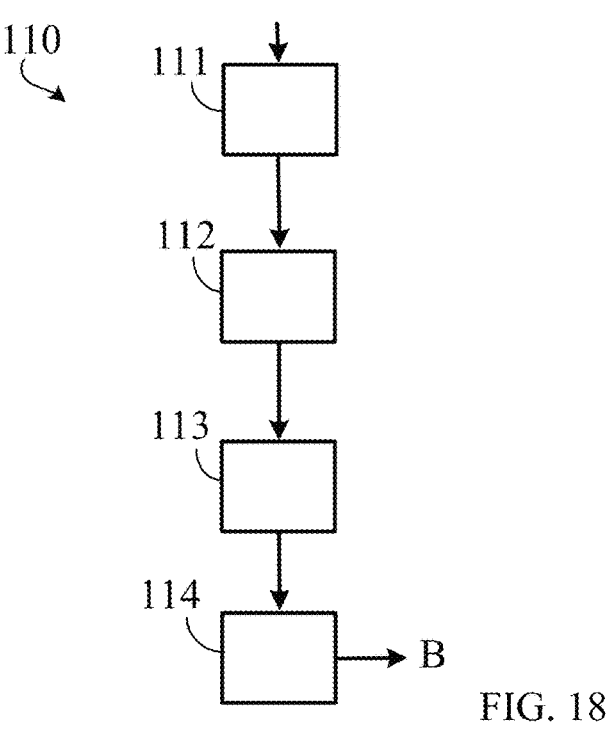
FIG. 18 shows schematic block diagram of step 110 in accordance with at least one exemplary embodiment.

In one exemplary embodiment of step 110, illustrated on FIG. 18, in step 111, a CTU grid may be determined to split at least one component of the video picture VP into CTUs. For example, the number of columns of the CTU grid is given by dividing the width of a component of the video picture VP by a CTU width CTU DW and the number of rows of the CTU grid is given by dividing the height of said component of the video picture VP by a CTU height CTU DH.

For example, a CTU grid may be defined per component of the video picture VP. A single CTU grid may also be determined for the video picture VP.

In step 112, at least one shifting offset is determined by aligning at least one boundary of the CTU grid with at least one boundary separating picture area with low spatial activity from picture areas with high spatial activity of the video picture.

As a variant, if one CTB grid for luma component of the video picture VP is different of one CTU grid for chroma components of the video picture VP, the CTB grid for luma component may be shifted according to at least one first shifting offset SO1 and the CTB grid for chroma components may be shifted according to at least one second shifting offset SO2, distinct from the at least one first shifting offset SO1.

In step 113, the CTU grid is shifted according to said at least one shifting offset SO. Shifting a CTU grid means shifting each CTU of the CTU grid.

In one exemplary embodiment of step 113, the CTUs of the CTU grid are shifted by a horizontal shifting offset x-SO.

Figure 19:
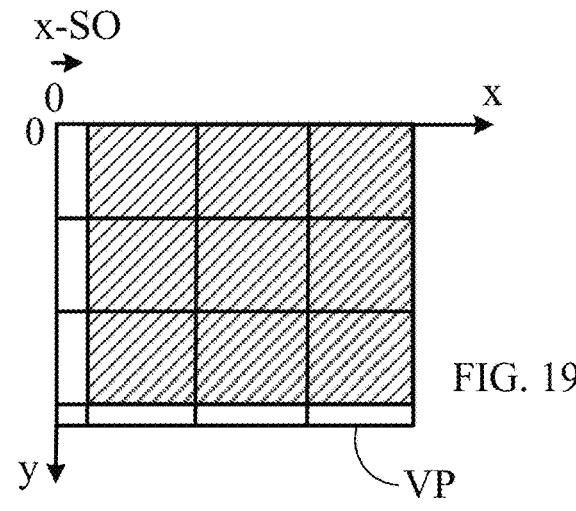
FIG. 19 shows an illustrated example of a CTU grid shifting in accordance with one exemplary embodiment.

For example, the horizontal shifting offset x-SO is determined to align the top-right most CTU of the CTU grid to the top-right corner of the video picture VP, as illustrated on FIG. 19. Partial CTUs then appear only along the left and/or bottom borders of the video picture VP.

In one exemplary embodiment of step 113, the CTUs of the CTU grid are shifted by a vertical shifting offset y-SO.

Figure 20:
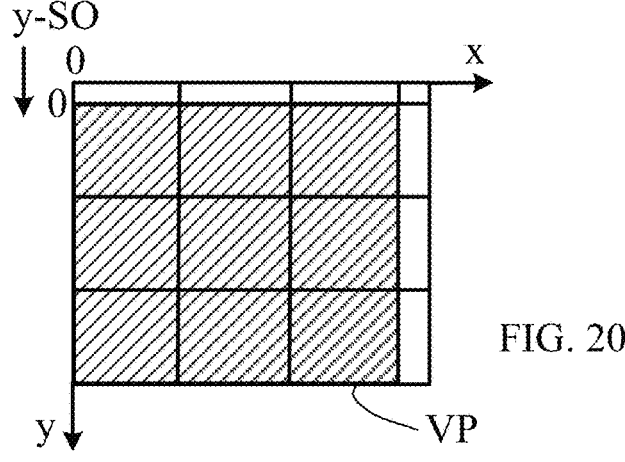
FIG. 20 shows an illustrated example of a CTU grid shifting in accordance with one exemplary embodiment.

For example, the vertical shifting offset y-SO is determined to align the bottom-left most CTU of the CTU grid to the bottom-left corner of the video picture VP, as illustrated on FIG. 20. Partial CTUs then appear only along the right and/or top borders of the video picture VP.

In one exemplary embodiment of step 113, the CTUs of the CTU grid are shifted by both a vertical shifting offset y-SO and a horizontal shifting offset x-SO.

For example, the vertical shifting offset y-SO and the horizontal shifting offset x-SO are determined to align the bottom-right most CTU of the CTU grid to the bottom-right corner of the video picture VP, as illustrated on FIG. 21. Partial CTUs then appear only along the left and/or top borders of the video picture VP.

FIG. 22 illustrates another example of a shifted CTU grid in which partial CTUs appear along the left, right, top and bottom borders of the video picture VP.

In one exemplary embodiment of step 112, the spatial activity of the video picture VP may be determined by detecting vertical and horizontal edges from the video picture content and the at least one boundary separating picture area with low spatial activity from picture areas with high spatial activity of the video picture is a detected vertical or horizontal edge.

A vertical or horizontal edge is a separation between two sets of samples of a component of the video picture VP, the samples of each set sharing particular picture properties. A vertical or horizontal edge also refers to an edge which is approximately vertical or horizontal, i.e. an edge having an angle around +/−15 degrees from a vertical or horizontal line.

A picture area with low spatial activity means a picture area without (or with few) vertical or horizontal edges and a picture area with high spatial activity is a picture area with more horizontal and vertical edges than in a low spatial activity picture area.

For example, each pixel of the video picture may be categorized as being either an edge sample or not, and a picture area is considered as having a low spatial activity if the number of edge samples of said picture area is lower than a threshold.

In one exemplary embodiment of step 112, vertical and horizontal edges of the video picture may be detected by applying horizontal and vertical Sobel filters on the video picture VP. These Sobel filters have a very low complexity and are well adapted for tasks such as detecting horizontal and vertical edges from a picture content.

FIG. 23 shows an example of coefficients of a horizontal Sobel filter Sh and an example of coefficients of a vertical Sobel Filter Sv.

The present disclosure is not limited to a particular edge detecting but extends to any other well-known method for detecting edges in a picture such as well-known Canny filter or any gradient-based edge detection method for example.

In variant, post-edge detection filter may discard some detected edges and the at least one shifting offset SO is determined from the remaining edges denoted principal edges.

In variant, post-edge detection filter may discard short edges possibly with a threshold, possibly based on a size related to the width, height of the video picture or the CTU size (height and/or width).

This variant is advantageous because only a limited number of vertical or horizontal edges are considered for determining at least one shifting offset.

In one exemplary embodiment of step 112, a spatial direction among a vertical or horizontal direction with less detected edges is selected, and principal detected edges along this direction are considered to determine the at least one shifting offset SO.

Thus, either at least one horizontal shifting offset or at least one vertical shifting offset is determined for aligning the CTU grid.

In one exemplary embodiment of step 112, the at least one shifting offset SO is determined by minimizing a spatial distance between boundaries of the CTU grid (including CTU boundaries and/or sub-CTU boundaries) and vertical or horizontal edges.

In one exemplary embodiment of step 112, at least one horizontal shifting offset x-SO is determined by minimizing a spatial distance between horizontal boundaries of the CTU grid and horizontal edges.

In one exemplary embodiment of step 112, at least one vertical shifting offset y-SO is determined by minimizing a spatial distance between vertical boundaries of the CTU grid (or vertical boundaries of sub-CTU) and vertical edges.

In one exemplary embodiment of step 112, a spatial distance between a boundary of the CTU grid and a vertical or horizontal edge is a length of a line segment perpendicular to the boundary of the CTU grid, starting from the boundary segment and intersecting the vertical or horizontal edge.

In one exemplary embodiment of step 112, the spatial distance is minimized using a linear regression method.

As an example, the at least one horizontal (respectively vertical) shifting offset $o_{pt}$ is obtained by minimizing the square spatial distance d (or average distance) between the closest horizontal (respectively vertical) boundaries of the CTU grid CTUBound$_{closest}$(i) and horizontal (respectively vertical) detected edges ContentEdge(i):

$$o_{opt} = \underset{o}{\operatorname{argmin}} \sum_{i=1}^{n} d(CTUbound_{closest}(o) - ContentEdge(i))^2$$

with O the set of horizontal (respectively vertical) shifting offsets and n the number of horizontal (respectively vertical) edges.

A closest horizontal (respectively vertical) boundary of the CTU grid may be the one just above or just below (respectively just on the right or on the left).

In one exemplary embodiment of step 112, the at least one shifting offset SO is determined per video picture.

In one exemplary embodiment of step 112, the at least one shifting offset SO is determined per video (same shifting offset(s) for all video pictures of a video). Said at least one shifting offset SO is the most representative shifting offset of the video, i.e. the shifting offset the most used over video pictures of the video or the one that leads to a minimum distortion of decoded video.

The present disclosure is not limited to a particular criterium for determining the most representative shifting offset SO of a video from shifting offset SO determined for each video picture of said video.

In one exemplary embodiment of step 112, a shifting offset SO is defined from either top-left, top-right, bottom-left or bottom-right corner of the video picture VP.

Preferably, a shifting offset SO is defined from the top-left corner of the video picture VP.

In one exemplary embodiment of step 112, a shifting offset SO may be indicated or defined as a block or CU size, e.g. in units of 8 samples.

In one exemplary embodiment of step 112, a shifting offset SO may be indicated or defined as a CU split depth size, e.g. MinQTSize or MinBtSize.

In one exemplary embodiment of step 112, a shifting offset SO may be indicated or defined as an index of a partition size.

In one exemplary embodiment of step 112, a shifting offset SO may be indicated or defined as an index indicating on which video picture border the CTU grid alignment occurs.

In one exemplary embodiment of step 110, in step 114, shifting information data is signaled (encoded) into the bitstream B. The shifting information data comprises a binary data indicating if at least one shifting offset is present in the bitstream B, and signalling (encoding) into the bitstream B the at least one determined shifting offset if the shifting information data indicates that at least one shifting offset is present into the bitstream B.

In a variant, the shifting information data is signalled (encoded) into the bitstream in a parameter set like the Sequence Parameter Set, Picture Parameter Set or in a Picture Header syntax element according to the terminology of VVC or HEVC.

FIG. 24 shows an example of a syntax element denoted seq_parameter_set_rbsp carrying a sequence parameter set (SPS). According to the present disclosure, the syntax element seq_parameter_set_rbsp comprises shifting information data comprising a flag sps_ctu_shift_flag and, if the syntax element sps_ctu_shift_flag equals 1, syntax elements sps_ctu_left_offset and sps_ctu_top_offset are encoded into the syntax element seq_parameter_set-rbsp.

The syntax element sps_ctu_shift_flag equals 1 to indicate if at least one shifting offset follow next in the SPS. The syntax element sps_ctu_shift_flag equals 0 to indicate that shifting offsets are not present in the SPS.

The syntax elements sps_ctu_left_offset (also possibly denoted sps_ctu_top_left_offset_x) respectively sps_ctu_top_offset, (also possibly denoted sps_ctu_top_left_offset_y) specifies a horizontal, respectively vertical, shifting offset.

For example, the shifting offsets signalled by the syntax elements sps_ctu_left_offset and sps_ctu_top_offset may be used to shift the first top left CTU of the CTU grid. When the syntax element equals 0, the syntax elements sps_ctu_left_offset and sps_ctu_top_offset are inferred to be equal to 0.

In one exemplary embodiment of step 114, the shifting offsets (syntax elements sps_ctu_left_offset and sps_ctu_top_offset) are still greater than 0.

In variant, the shifting offsets (syntax elments sps_ctu_left_offset and sps_ctu_top_offset) may equal an integer multiple of Max (8, MinCbSizeY).

The syntax elements sps_ctu_left_offset and sps_ctu_top_offset may be indexed in multiple of Max (8, MinCb-SizeY).

In variant, the shifting offsets (syntax elments sps_ctu_left_offset and sps_ctu_top_offset) may equal an integer multiple of 8.

The syntax elements sps_ctu_left_offset and sps_ctu_top_offset may be indexed in multiple of 8.

The syntax elements sps_ctu_left_offset and sps_ctu_top_offset may be renamed sps_ctu_left_offset_div8_minus1 and sps_ctu_top_offset_div8_minus1.

These two last variants ensure that a partial CTU/split CU at a video picture border can be handled by legacy codec core modules such as transform, quantization, filtering, etc.

In one exemplary embodiment of step 114, the shifting offsets (syntax elements sps_ctu_left_offset and sps_ctu_top_offset) are lower than a size of a partial CTU size, i.e. the syntax element sps_ctu_left_offset is lower than a partial CTU width and the syntax element sps_ctu_top_offset is lower than a partial CTU height.

In one exemplary embodiment of step 114, the syntax element sps_ctu_left_offset is less than a value given by pps_pic_width_in_luma_samples−Floor (pps_pic_width_in_luma_samples÷CtbSizeY)*1<< (sps_log 2_ctu_size_minus5+5).

In one exemplary embodiment of step 114, the syntax element sps_ctu_left_offset is less than a CTU width or the syntax element sps_ctu_top_offset is less than CTU height. The CTU width or CTU height may be specified by the syntax element sps_log 2_ctu_size_minus5 in the SPS (FIG. 24).

In one exemplary embodiment of step 114, the syntax element sps_ctu_left_offset is less than half CTU width or the syntax element sps_ctu_top_offset is less than half CTU height.

The syntax element seq_parameter_set_rbsp comprises a syntax element sps_chroma_format_idc. When the syntax element sps_chroma_format_idc is not equal to 0, the corresponding chroma CTB are the CTB having picture coordinates (CtbAddrX/SubWidthC, CtbAddrY/SubHeightC), where (CtbAddrX, CtbAddrY) are the luma CTB coordinates of specified luma samples.

In one exemplary embodiment of step 114, the syntax element sps_ctu_right_alignment_flag and sps_bottom_alignment_flag indicate whether the entire CTU grid (i.e. the set of entire CTUs) is aligned on right, left, top or bottom picture borders. Thus, the entire CTU grid where sps_ctu_right_alignment_flag and sps_bottom_alignment_flag are equal to 1 indicate that the entire CTU grid is aligned on bottom right picture border and this case matches with FIG. 21. FIG. 20 also matches with sps_ctu_right_alignment_flag equal to 0 and sps_bottom_alignment_flag equal to 1. FIG. 19 also matches with sps_ctu_right_alignment_flag equal to 1 and sps_bottom_alignment_flag equal to 0.

In one exemplary embodiment, the current block partitioning rule as in VVC may be extended to handle the block partitioning of partial CTUs of the CTU grid spatially located, if exist, on the left and/or top borders of the video picture VP.

Essentially mechanisms and equations present in VVC specification used to index and construct sub-pictures, tiles and slices can be reused with minor adjustments.

As an example, numbers (indices) are assigned to complete partial CTUs ordered in a raster scan order. Introducing shifting offsets SO does not change fundamentally such a CTU numbering because the first top left partial CTU, if exists, may be assigned an index 0 and the consecutive complete CTUs in raster scan order may be indexed 1, 2, etc.

As another example, a number of CTU columns per luma CTB PicWidthInCtbsY and a number of CTU rows per luma CTB PicHeightInCtbsY are usually calculated by:

$$PicWidthInCtbsY = \text{Ceil}\,(\text{pps\_pic\_width\_in\_luma\_samples} \div CtbSizeY)$$

$$PicHeightInCtbsY = \text{Ceil}\,(\text{pps\_pic\_heigth\_in\_luma\_samples} \div CtbSizeY)$$

where pps_pic_width_in_luma_samples is the number of samples of the width of the video picture VP and pps_pic_heigth_in_luma_samples is a number of samples of the height of the video picture VP, and CtbSizeY is a size of a luma CTB.

According to the present disclosure, if the syntax element sps_ctu_shift_flag equals 1 and the CTU grid is horizontally shifted, the number of CTU columns per luma CTB PicWidthInCtbsY is given by:

$$PicWidthInCtbsY = $$
$$\text{Ceil}\,((\text{pps\_pic\_width\_in\_luma\_samples} - \text{sps\_ctu\_left\_offset}) \div$$
$$CtbSizeY) + 1$$

According to the present disclosure, if the syntax element sps_ctu_shift_flag equals 1 and the CTU grid is vertically shifted, the number of CTU rows per luma CTB PicHeightInCtbsY is given by:

$$PicHeightInCtbsY = $$
$$\text{Ceil}\,((\text{pps\_pic\_heigth\_in\_luma\_samples} - \text{sps\_ctu\_top\_offset}) \div$$
$$CtbSizeY) + 1$$

As another example, the syntax element coding_tree_unit that defines the spatial location coordinates (xCtb,yCtb) of the top-left corner of a luma CTB is amended according to the present disclosure.

If the syntax element sps_ctu_shift_flag equals 1 and the CTU grid is horizontally shifted, the first luma sample of the CTUs (uncomplete or partial) of the first CTU column are located at abscissa 0. The first luma sample of the second CTU column (complete or entire) are located at abscissa position sps_ctu_left_offset. The first luma sample of the third CTU column (complete) are located at abscissa position sps_ctu_left_offset+CtbSizeY. The first luma sample of the fourth CTU column (complete) are located at abscissa position sps_ctu_left_offset+2*CtbSizeY etc. Same reasoning for the ordinate and sps_ctu_top_offset.

FIG. 25 shows an example of the syntax element coding_tree_unit in accordance with at least one exemplary embodiment.

The ctbLeftOffset and ctbTopOffset variables define shifting offsets of a CTB (luma or chroma) and are derived as follows:

$$ctbLeftOffset = \text{sps\_ctu\_shift\_flag?sps\_ctu\_left\_offset:}\ CtbSizeY$$

$$ctbTopOffset = \text{sps\_ctu\_shift\_flag?sps\_ctu\_top\_offset:}\ CtbSizeY$$

As other examples, variables specifying sample position may be shifted by shifting offsets SO (e.g. in Loop Filtering).

Tiles and slices remain aligned on CTU borders even if CTU grid shifting and the rules on CTU/slice/tiles cohabitation already in place in VVC are still valid.

FIG. 26 shows schematic block diagram of step 210 in accordance with at least one exemplary embodiment.

A CTU grid of representing a spatial partition of a video picture VP is obtained from partition information data (step 210). For example, the number of columns of the CTU grid is given by dividing the width of a component of the video picture VP by a CTU width CTU DW and the number of rows of the CTU grid is given by dividing the height of said component of the video picture VP by a CTU height CTU DH.

For example, a CTU grid may be defined per component of the video picture VP. A single CTU grid may also be determined for the video picture VP.

In step 211, at least one shifting offset SO is obtained.

As a variant, if one CTB grid for luma component of the video picture VP is different of one CTU grid for chroma components of the video picture VP, the CTB grid for luma component may be shifted according to at least one first shifting offset SO1 and the CTB grid for chroma components may be shifted according to at least one second shifting offset SO2, distinct from the at least one first shifting offset SO1.

In one exemplary embodiment of step 211, the at least one shifting offset SO is a horizontal shifting offset x-SO.

In one exemplary embodiment of step 211, the at least one shifting offset SO is one vertical shifting offset y-SO.

In one exemplary embodiment of step 211, one of the at least one shifting offset SO is a vertical shifting offset y-SO and another one is one horizontal shifting offset x-SO.

In one exemplary embodiment of step 211, shifting information data is decoded (signaled) from the bitstream B. The shifting information data comprises a binary data indicating if at least one shifting offset is present in the bitstream B, and decoding (signalling) from the bitstream B the at least one determined shifting offset if the shifting information data indicates that at least one shifting offset is present into the bitstream B.

In a variant, the shifting information data is signalled (decoded) from the bitstream in a parameter set like the Sequence Parameter Set, Picture Parameter Set or in a Picture Header syntax element according to the terminology of VVC or HEVC.

In step 212, the CTU grid is shifted according to the at least one shifting offset SO (or SO1 and SO2).

Figure 27:
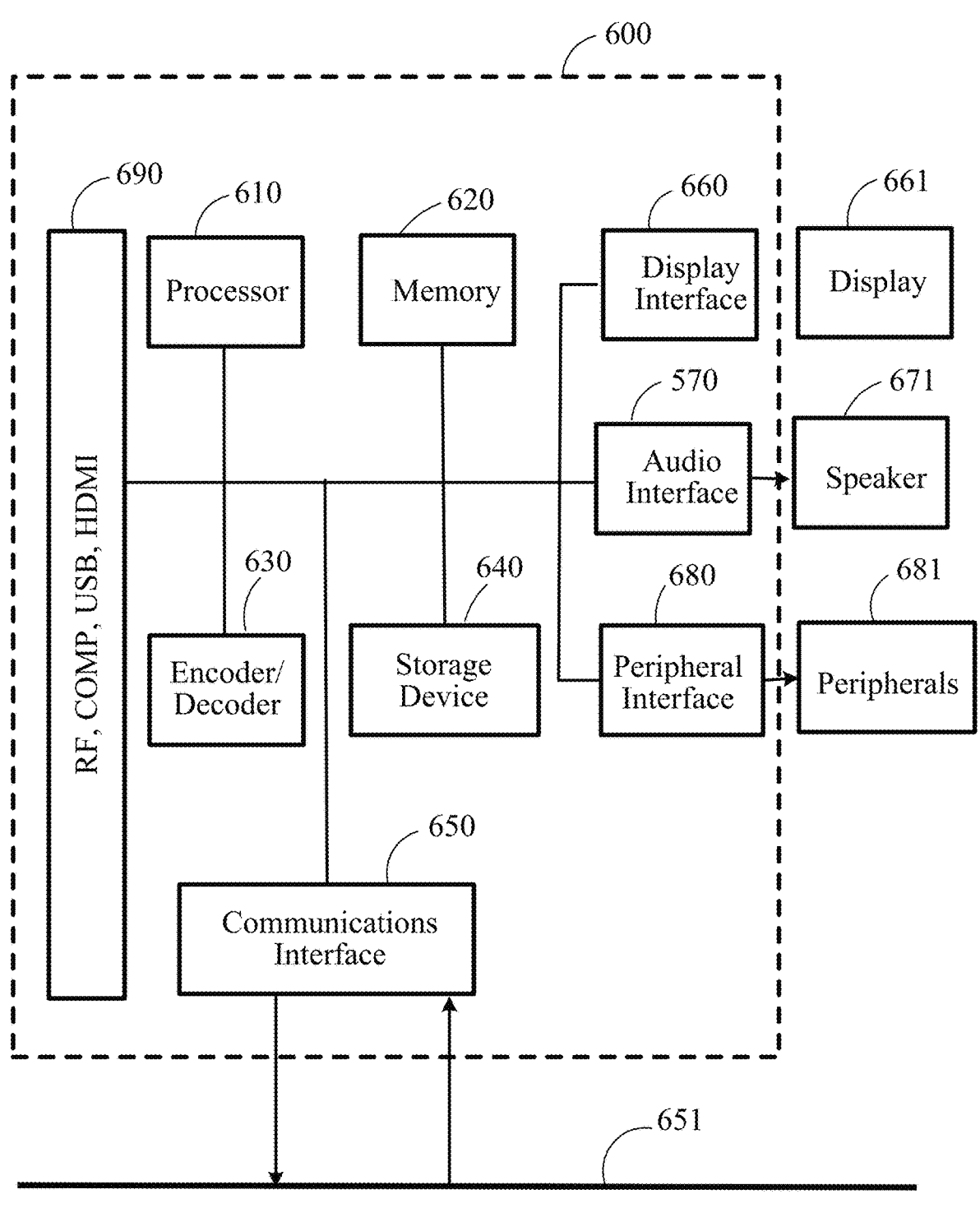
FIG. 27 illustrates a schematic block diagram of an example of a system in which various aspects and exemplary embodiments are implemented.

FIG. 27 shows a schematic block diagram illustrating an example of a system 600 in which various aspects and exemplary embodiments are implemented.

System 600 may be embedded as one or more devices including the various components described below. In various embodiments, system 600 may be configured to implement one or more of the aspects described in the present application.

Examples of equipment that may form all or part of the system 600 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, video servers (e.g. a broadcast server, a video-on-demand server or a web server), still or video camera, encoding or decoding chip or any other communication devices. Elements of system 600, singly or in combination, may be embodied in a single integrated circuit (IC), multiple ICs, and/or discrete components. For example, in at least one embodiment, the processing and encoder/decoder elements of system 600 may be distributed across multiple ICs and/or discrete components. In various embodiments, system 600 may be communicatively coupled to other similar systems, or to other electronic devices, via, for example, a communications bus or through dedicated input and/or output ports.

System 600 may include at least one processor 610 configured to execute instructions loaded therein for implementing, for example, the various aspects described in the present application. Processor 610 may include embedded memory, input output interface, and various other circuitries as known in the art. System 600 may include at least one memory 620 (for example a volatile memory device and/or a non-volatile memory device). System 600 may include a storage device 640, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 640 may include an internal storage device, an attached storage device, and/or a network accessible storage device, as non-limiting examples.

System 600 may include an encoder/decoder module 630 configured, for example, to process data to provide encoded/decoded video picture data, and the encoder/decoder module 630 may include its own processor and memory. The encoder/decoder module 630 may represent module(s) that may be included in a device to perform the encoding and/or decoding functions. As is known, a device may include one or both encoding and decoding modules. Additionally, encoder/decoder module 630 may be implemented as a separate element of system 600 or may be incorporated within processor 610 as a combination of hardware and software as known to those skilled in the art.

Program code to be loaded onto processor 610 or encoder/decoder 630 to perform the various aspects described in the present application may be stored in storage device 640 and subsequently loaded onto memory 620 for execution by processor 610. In accordance with various embodiments, one or more of processor 610, memory 620, storage device 640, and encoder/decoder module 630 may store one or more of various items during the performance of the processes described in the present application. Such stored items may include, but are not limited to video picture data, information data used for encoding/decoding video picture data, a bitstream, matrices, variables, and intermediate or final results from the processing of equations, formulas, operations, and operational logic.

In several embodiments, memory inside of the processor 610 and/or the encoder/decoder module 630 may be used to store instructions and to provide working memory for processing that may be performed during encoding or decoding.

In other embodiments, however, a memory external to the processing device (for example, the processing device may be either the processor 610 or the encoder/decoder module 630) may be used for one or more of these functions. The external memory may be the memory 620 and/or the storage device 640, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), AVC, HEVC, EVC, VVC, AV1, etc.

The input to the elements of system 600 may be provided through various input devices as indicated in block 690. Such input devices include, but are not limited to, (i) an RF portion that may receive an RF signal transmitted, for example, over the air by a broadcaster, (ii) a Composite input terminal, (iii) a USB input terminal, (iv) an HDMI input terminal, (v) a bus such as CAN (Controller Area Network), CAN FD (Controller Area Network Flexible Data-Rate), FlexRay (ISO 17458) or Ethernet (ISO/IEC 802-3) bus when the present disclosure is implemented in the automotive domain.

In various embodiments, the input devices of block 690 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 600 to other electronic devices across USB and/or HDMI connections. It is to be understood that various aspects of input processing, for example, Reed-Solomon error correction, may be implemented, for example, within a separate input processing IC or within processor 610 as necessary. Similarly, aspects of USB or HDMI interface processing may be implemented within separate interface ICs or within processor 610 as necessary. The demodulated, error corrected, and demultiplexed stream may be provided to various processing elements, including, for example, processor 610, and encoder/decoder 630 operating in combination with the memory and storage elements to process the data stream as necessary for presentation on an output device.

Various elements of system 600 may be provided within an integrated housing. Within the integrated housing, the various elements may be interconnected and transmit data therebetween using suitable connection arrangement 690, for example, an internal bus as known in the art, including the I2C bus, wiring, and printed circuit boards.

The system 600 may include communication interface 650 that enables communication with other devices via communication channel 651. The communication interface 650 may include, but is not limited to, a transceiver configured to transmit and to receive data over communication channel 651. The communication interface 650 may include, but is not limited to, a modem or network card and the communication channel 651 may be implemented, for example, within a wired and/or a wireless medium.

Data may be streamed to system 600, in various embodiments, using a Wi-Fi network such as IEEE 802.11. The Wi-Fi signal of these embodiments may be received over the communications channel 651 and the communications interface 650 which are adapted for Wi-Fi communications. The communications channel 651 of these embodiments may be typically connected to an access point or router that provides access to outside networks including the Internet for allowing streaming applications and other over-the-top communications.

Other embodiments may provide streamed data to the system 600 using a set-top box that delivers the data over the HDMI connection of the input block 690.

Still other embodiments may provide streamed data to the system 600 using the RF connection of the input block 690.

The streamed data may be used as a way for signaling information used by the system 600. The signaling information may comprise the bitstream B and/or information such a number of pixels of a video picture and/or any coding/decoding setup parameters.

It is to be appreciated that signaling may be accomplished in a variety of ways. For example, one or more syntax elements, flags, and so forth may be used to signal information to a corresponding decoder in various embodiments.

System 600 may provide an output signal to various output devices, including a display 661, speakers 671, and other peripheral devices 681. The other peripheral devices 681 may include, in various examples of embodiments, one or more of a stand-alone DVR, a disk player, a stereo system, a lighting system, and other devices that provide a function based on the output of system 600.

In various embodiments, control signals may be communicated between the system 600 and the display 661, speakers 671, or other peripheral devices 681 using signaling such as AV.Link (Audio/Video Link), CEC (Consumer Electronics Control), or other communications protocols that enable device-to-device control with or without user intervention.

The output devices may be communicatively coupled to system 600 via dedicated connections through respective interfaces 660, 670, and 680.

Alternatively, the output devices may be connected to system 600 using the communications channel 651 via the communications interface 650. The display 661 and speakers 671 may be integrated in a single unit with the other components of system 600 in an electronic device such as, for example, a television.

In various embodiments, the display interface 660 may include a display driver, such as, for example, a timing controller (T Con) chip.

The display 661 and speaker 671 may alternatively be separate from one or more of the other components, for example, if the RF portion of input 690 is part of a separate set-top box. In various embodiments in which the display 661 and speakers 671 may be external components, the output signal may be provided via dedicated output connections, including, for example, HDMI ports, USB ports, or COMP outputs.

In FIGS. 1-27, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer-readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing video pictures or other communication devices. As should be clear, the equipment may be mobile and even installed in a mobile vehicle.

Computer software may be implemented by the processor 610 or by hardware, or by a combination of hardware and software. As a non-limiting example, the embodiments may be also implemented by one or more integrated circuits. The memory 620 may be of any type appropriate to the technical environment and may be implemented using any appropriate data storage technology, such as optical memory devices, magnetic memory devices, semiconductor-based memory devices, fixed memory, and removable memory, as non-limiting examples. The processor 610 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. —For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

According to a first aspect of the present application, there is provided a method of encoding a video picture into a bitstream of encoded video picture data. The method comprises obtaining a grid of coding-tree units to split at least one component of the video picture into coding-tree units, each coding-tree unit being a picture area subdivided according to a coding tree; determining at least one shifting offset by aligning at least one boundary of the grid of coding-tree units with at least one boundary separating picture area with low spatial activity from picture areas with high spatial activity of the video picture; shifting the grid of coding-tree units according to the at least one shifting offset; obtaining encoded video picture data by encoding at least one coding unit of a coding tree associated with each coding-tree unit of the shifted grid of coding-tree units; and writing the encoded video data into the bitstream.

In one exemplary embodiment, the spatial activity of the video picture is determined by detecting vertical and horizontal edges from the video picture content and the at least one boundary separating picture area with low spatial activity from picture areas with high spatial activity of the video picture is a detected vertical or horizontal edge.

In one exemplary embodiment, the at least one shifting offset is determined by minimizing a spatial distance between boundaries of the grid of coding-tree units and detected vertical or horizontal edges.

According to a second aspect of the present application, there is provided a method of decoding a video picture from a bitstream of encoded video picture data. The method comprises determining a grid of coding-tree units representing a spatial partition of the video picture, each coding-tree unit representing a picture area of the video picture subdivided according to a coding tree; shifting the grid of coding-tree units according to at least one shifting offset; obtaining video picture data by decoding at least one coding unit of a coding tree associated with each coding tree unit of the shifted grid of coding-tree units from the bitstream; and obtaining the video picture from said video picture data.

In one exemplary embodiment, the method further comprises signaling into the bitstream syntax elements indicating whether the grid of coding-tree units is vertically shifted, horizontally shifted or both.

In one exemplary embodiment, the method further comprises signaling into the bitstream shifting information data comprising a binary data indicating if at least one shifting offset is present in the bitstream and signalling into the bitstream the at least one shifting offset if the shifting information data indicates that at least one shifting offset is present into the bitstream.

In one exemplary embodiment, the shifting information data is signalled in a syntax element comprising a sequence parameter set, a picture parameter set or a picture header.

In one exemplary embodiment, the video picture comprising a luma component comprising a set of luma samples, the at least one shifting offset is an integer multiple of a maximum between 8 and a minimum coded block size for luma samples.

In one exemplary embodiment, the at least one shifting offset is an integer multiple of 8 or is indexed in multiple of 8.

In one exemplary embodiment, the at least one shifting offset is lower than a size of a partial coding-tree unit size.

According to a third aspect of the present application, there is provided a bitstream of encoded a video picture generated by one of the method according to the first aspect of the present application.

According to a fourth aspect of the present application, there is provided an apparatus of encoding a video picture into a bitstream of encoded video picture data. The apparatus comprises means for performing one of the method according to the first aspect of the present application.

According to a fifth aspect of the present application, there is provided an apparatus of decoding a video picture from a bitstream of encoded video picture data. The apparatus comprises for performing one of the method according to the second aspect of the present application.

According to a sixth aspect of the present application, there is provided a computer program product including instructions which, when the program is executed by one or more processors, causes the one or more processors to carry out a method according to the first aspect of the present application.

According to a seventh aspect of the present application, there is provided a non-transitory storage medium carrying instructions of program code for executing a method according to the first aspect of the present application.

According to an eighth aspect of the present application, there is provided a computer program product including instructions which, when the program is executed by one or more processors, causes the one or more processors to carry out a method according to the second aspect of the present application.

According to a nineth aspect of the present application, there is provided a non-transitory storage medium carrying instructions of program code for executing a method according to the second aspect of the present application.

The specific nature of at least one of the exemplary embodiments as well as other objects, advantages, features and uses of said at least one of exemplary embodiments will become evident from the description of examples taken in conjunction with the drawings.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of state, for example, features, integers, steps, operations, elements, and/or components but do not preclude the presence or addition of one or more other features, integers, steps, operations, elements, components, and/or groups thereof. Moreover, when an element is referred to as being "responsive" or "connected" or "associated with" to another element, it may be directly responsive or connected to or associated with the other element, or intervening elements may be present. In contrast, when an element is referred to as being "directly responsive" or "directly connected" to or "directly associated with" other element, there are no intervening elements present.

It is to be appreciated that the use of any of the symbol/ term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of the present application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout the present application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the present application are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "decoding", as used in this application, may encompass all or part of the processes performed, for example, on a received video picture (including possibly a received bitstream which encodes one or more video picture) in order to produce a final output suitable for display or for further processing in the reconstructed video domain. In various embodiments, such processes include one or more of the processes typically performed by a decoder. In various embodiments, such processes also, or alternatively, include processes performed by a decoder of various implementations described in the present application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific description and is believed to be well understood by those skilled in the art.

Various implementations involve encoding. In an analogous way to the above discussion about "decoding", "encoding" as used in the present application may encompass all or part of the processes performed, for example, on an input video picture in order to produce an output bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, the present application may refer to "obtaining" various pieces of information. Obtaining the information may include one or more of, for example, estimating the information, calculating the information, predicting the information, or retrieving the information from memory, processing the information, moving the information, copying the information, erasing the information, calculating the information, determining the information, predicting the information, or estimating the information.

Additionally, this application may refer to "receiving" various pieces of information. Receiving the information may include one or more of, for example, accessing the information, or receiving information from a communication network.

Also, as used herein, the word "signal" refers to, among other things, indicating something to a corresponding decoder. For example, in certain embodiments the encoder signals a particular information such as coding parameter or encoded video picture data. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a video picture into a bitstream of encoded video picture data, wherein the method comprises:

obtaining a grid of coding-tree units to split at least one component of the video picture into coding-tree units, each coding-tree unit being a picture area subdivided according to a coding tree;

determining at least one shifting offset by aligning at least one boundary of the grid of coding-tree units with at least one boundary separating picture areas with low spatial activity from picture areas with high spatial activity of the video picture;

shifting the grid of coding-tree units according to the at least one shifting offset;

obtaining encoded video picture data by encoding at least one coding unit (CU) of a coding tree associated with each coding-tree unit (CTU) of the shifted grid of coding-tree units; and writing the encoded video picture data into the bitstream.

2. The method of claim 1, wherein a spatial activity of the video picture is determined by detecting vertical and horizontal edges from video picture content and the at least one boundary separating picture areas with low spatial activity from picture areas with high spatial activity of the video picture is a detected vertical or horizontal edge.

3. The method of claim 2, wherein the at least one shifting offset is determined by minimizing a spatial distance between boundaries of the grid of coding-tree units and detected vertical or horizontal edges.

4. A method of decoding a video picture from a bitstream of encoded video picture data, wherein the method comprises:

determining a grid of coding-tree units representing a spatial partition of the video picture, each coding-tree unit representing a picture area of the video picture subdivided according to a coding tree;

shifting the grid of coding-tree units according to at least one shifting offset;

obtaining video picture data by decoding at least one coding unit (CU) of a coding tree associated with each coding tree unit (CTU) of the shifted grid of coding-tree units from the bitstream; and obtaining the video picture from the video picture data.

5. The method of claim 4, further comprising:

signaling into the bitstream syntax elements indicating whether the grid of coding-tree units is vertically shifted, horizontally shifted or both.

6. The method of claim 4, further comprising:

signaling into the bitstream shifting information data comprising a binary data indicating if at least one shifting offset is present in the bitstream and signalling into the bitstream the at least one shifting offset if the shifting information data indicates that at least one shifting offset is present into the bitstream.

7. The method of claim 6, wherein the shifting information data is signalled in a syntax element comprising a sequence parameter set, a picture parameter set or a picture header.

8. The method of claim 4, wherein the video picture comprises a luma component comprising a set of luma samples, the at least one shifting offset is an integer multiple of a maximum between 8 and a minimum coded block size for luma samples.

9. The method of claim 4, wherein the at least one shifting offset is an integer multiple of 8 or is indexed in multiple of 8.

10. The method of claim 4, wherein the at least one shifting offset is lower than a size of a partial coding-tree unit size.

11. An apparatus for encoding a video picture into a bitstream of encoded video picture data, the apparatus comprising:

a processor; and a memory storing instructions executable by the processor;

wherein the processor is configured to perform the method of claim 1.

12. An apparatus for video decoding a video picture from a bitstream of encoded video picture data, the apparatus comprising:

a processor; and a memory storing instructions executable by the processor;

wherein the processor is configured to perform:

determining a grid of coding-tree units representing a spatial partition of the video picture, each coding-tree unit representing a picture area of the video picture subdivided according to a coding tree;

shifting the grid of coding-tree units according to at least one shifting offset;

obtaining video picture data by decoding at least one coding unit (CU) of a coding tree associated with each coding tree unit (CTU) of the shifted grid of coding-tree units from the bitstream; and obtaining the video picture from the video picture data.

13. A non-transitory storage medium carrying instructions of program code for executing the method of claim 1.

14. The apparatus of claim 12, wherein the processor is further configured to perform:

signaling into the bitstream syntax elements indicating whether the grid of coding-tree units is vertically shifted, horizontally shifted or both.

15. The apparatus of claim 12, wherein the processor is further configured to perform:

signaling into the bitstream shifting information data comprising a binary data indicating if at least one shifting offset is present in the bitstream and signalling into the bitstream the at least one shifting offset if the shifting information data indicates that at least one shifting offset is present into the bitstream.

16. The apparatus of claim 15, wherein the shifting information data is signalled in a syntax element comprising a sequence parameter set, a picture parameter set or a picture header.

17. The apparatus of claim 12, wherein the video picture comprises a luma component comprising a set of luma samples, the at least one shifting offset is an integer multiple of a maximum between 8 and a minimum coded block size for luma samples.

18. The apparatus of claim 12, wherein the at least one shifting offset is an integer multiple of 8 or is indexed in multiple of 8.

19. The apparatus of claim 12, wherein the at least one shifting offset is lower than a size of a partial coding-tree unit size.

20. A non-transitory storage medium carrying instructions of program code for executing the method of claim 4.

\* \* \* \* \*